US012701410B2

(12) United States Patent
Rajadurai et al.

(10) Patent No.: US 12,701,410 B2
(45) Date of Patent: Aug. 4, 2026

(54) SYSTEM AND METHOD FOR KEY GENERATION IN AUTHENTICATION AND KEY MANAGEMENT FOR APPLICATIONS (AKMA)

(71) Applicant: SAMSUNG ELECTRONICS CO., LTD., Suwon-si (KR)

(72) Inventors: Rajavelsamy Rajadurai, Bangalore (IN); Nivedya Parambath Sasi, Bangalore (IN); Rajendran Rohini, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 18/577,645

(22) PCT Filed: Jul. 7, 2022

(86) PCT No.: PCT/KR2022/009835

§ 371 (c)(1),
(2) Date: Jan. 8, 2024

(87) PCT Pub. No.: WO2023/282656

PCT Pub. Date: Jan. 12, 2023

(65) Prior Publication Data

US 2024/0323679 A1 Sep. 26, 2024

(30) Foreign Application Priority Data

Jul. 8, 2021 (IN) .............................. 202141030717
Jun. 13, 2022 (IN) .............................. 202141030717

(51) Int. Cl.
*H04W 12/041* (2021.01)
*H04W 12/0431* (2021.01)

(52) U.S. Cl.
CPC ..... *H04W 12/041* (2021.01); *H04W 12/0431* (2021.01)

(58) Field of Classification Search
CPC ........................ H04W 12/041; H04W 12/0431
See application file for complete search history.

(56) References Cited

U.S. PATENT DOCUMENTS

2022/0174063 A1    6/2022  Wu et al.
2022/0278835 A1*   9/2022  Guo .................... H04W 12/041
(Continued)

FOREIGN PATENT DOCUMENTS

WO        2020093864 A1      5/2020
WO        2021031053 A1      2/2021
(Continued)

OTHER PUBLICATIONS

International Search Report and Written Opinion of the International Searching Authority dated Oct. 5, 2022, in connection with International Application No. PCT/KR2022/009835, 7 pages.
(Continued)

*Primary Examiner* — David J Pearson

(57) ABSTRACT

The disclosure relates to a 5G or 6G communication system for supporting a higher data transmission rate. Embodiments herein provide a system and method for key refresh in Authentication and Key Management for Applications (AKMA). The proposed method is to support $K_{AKMA}$ refresh by requesting the refreshing parameters from the network once the $K_{AF}$ is about to expire. Further, the proposed method is to support $K_{AF}$ refresh by requesting the refreshing parameters from the network once the $K_{AF}$ is about to expire. Further the proposed method uses certain mechanisms to provide the refresh parameter to the AUSF, AAnF and the UE as a part of AKMA Refresh procedure or as a part of UPU procedure. Further, the proposed method supports AKMA key refresh with limited impacts on AKMA services (Continued)

in 5G system. Furthermore, the proposed method is used to support a mechanism to address the Key synchronisation issue at a User Equipment (UE) side, AF and at the network side.

12 Claims, 12 Drawing Sheets

(56) References Cited

U.S. PATENT DOCUMENTS

| | | | | |
|---|---|---|---|---|
| 2022/0330019 | A1 | 10/2022 | Yu et al. | |
| 2022/0368684 | A1* | 11/2022 | You | H04L 9/0861 |
| 2022/0377540 | A1* | 11/2022 | Deng | H04L 63/061 |
| 2023/0086032 | A1* | 3/2023 | Guo | H04W 12/065 |
| | | | | 713/171 |

FOREIGN PATENT DOCUMENTS

| | | | |
|---|---|---|---|
| WO | 2021093162 | A1 | 5/2021 |
| WO | 2021094109 | A1 | 5/2021 |
| WO | 2021098115 | A1 | 5/2021 |
| WO | 2021109436 | A1 | 6/2021 |

OTHER PUBLICATIONS

Office Action dated Sep. 4, 2023, in connection with Indian Patent Application No. 202141030717, 5 pages.
Samsung, "Discussion on Refresh of KAF & KAKMA", S3-212073, Revision of S3-20xxxx, 3GPP TSG SA3 Meeting #103-e, e-meeting, May 17-28, 2021, 5 pages.
3GPP TS 33.535 V17.2.1 (Jun. 2021), Technical Specification, 3rd Generation Partnership Project; Technical Specification Group Services and System Aspects; Authentication and Key Management for Applications (AKMA) based on 3GPP credentials in the 5G system (5GS) (Release 17), Jun. 2021, 25 pages.
Samsung, "Refresh of KAF and KAKMA", S3-212074, 3GPP TSG SA Meeting #103-e, e-meeting, May 17-28, 2021, Online, 5 pages.
Ericsson, "Handling of AKMA keys in the UE", S3-211912, Revision of S3-20xxxx, 3GPP TSG SA Meeting #103-e, e-meeting, May 17-28, 2021, 4 pages.
3GPP TS 33.535 V17.8.0 (Mar. 2023), Technical Specification, 3rd Generation Partnership Project; Technical Specification Group Services and System Aspects; Authentication and Key Management for Applications (AKMA) based on 3GPP credentials in the 5G System (5GS) (Release 17), Mar. 2023, 25 pages.
3GPP TS 33.535 V18.0.0 (Jun. 2023), Technical Specification, 3rd Generation Partnership Project; Technical Specification Group Services and System Aspects; Authentication and Key Management for Applications (AKMA) based on 3GPP credentials in the 5G System (5GS) (Release 18), Jun. 2023, 29 pages.
Samsung, "New KI on HN initiated Re-authentication", S3-221125, 3GPP TSG-SA3 Meeting #107-e, e-meeting, May 16-20, 2022, 2 pages.
Huawei et al., "Scalability of the home triggered primary authentication", S3-221239, Merge of 834,708,822,820,904,905,041,1042,1125, 3GPP TSG-SA3 Meeting #107-e, e-meeting, May 16-20, 2022, 1 page.
Samsung, "New solution on UPU based re-authentication Procedure", S3-221129, 3GPP TSG-SA3 Meeting #107-e, e-meeting, May 16-20, 2022, 3 pages.
3GPP TS 33.501 V18.3.0 (Sep. 2023), Technical Specification, 3rd Generation Partnership Project; Technical Specification Group Services and System Aspects; Security architecture and procedures for 5G system (Release 18), 322 pages.
3GPP TR 33.741 V0.1.0 (May 2022), Technical Report, 3rd Generation Partnership Project; Technical Specification Group Services and System Aspects; Study on home network triggered primary authentication (HONTRA); (Release 18), May 2022, 10 pages.
Supplementary European Search Report dated Aug. 27, 2024, in connection with European Patent Application No. 22838008.5, 10 pages.
Samsung, "Support for AKMA Key Refresh Service Operation," C4-211227, 3GPP TSG-CT4 Meeting #102-e, E-Meeting, Feb. 24-Mar. 5, 2021, 6 pages.
Ericsson, "Solution #15 evaluation removal of EN," S3-193597, Revision of S3-19xxxx, 3GPP TSG-SA3 Meeting #96 Ad-Hoc, Chongqing, China, Oct. 14-18, 2019, 6 pages.
Notice of Allowance issued Jun. 23, 2026, in connection with Japanese Patent Application No. 2024500575, 5 pages.

* cited by examiner

[Fig. 1]
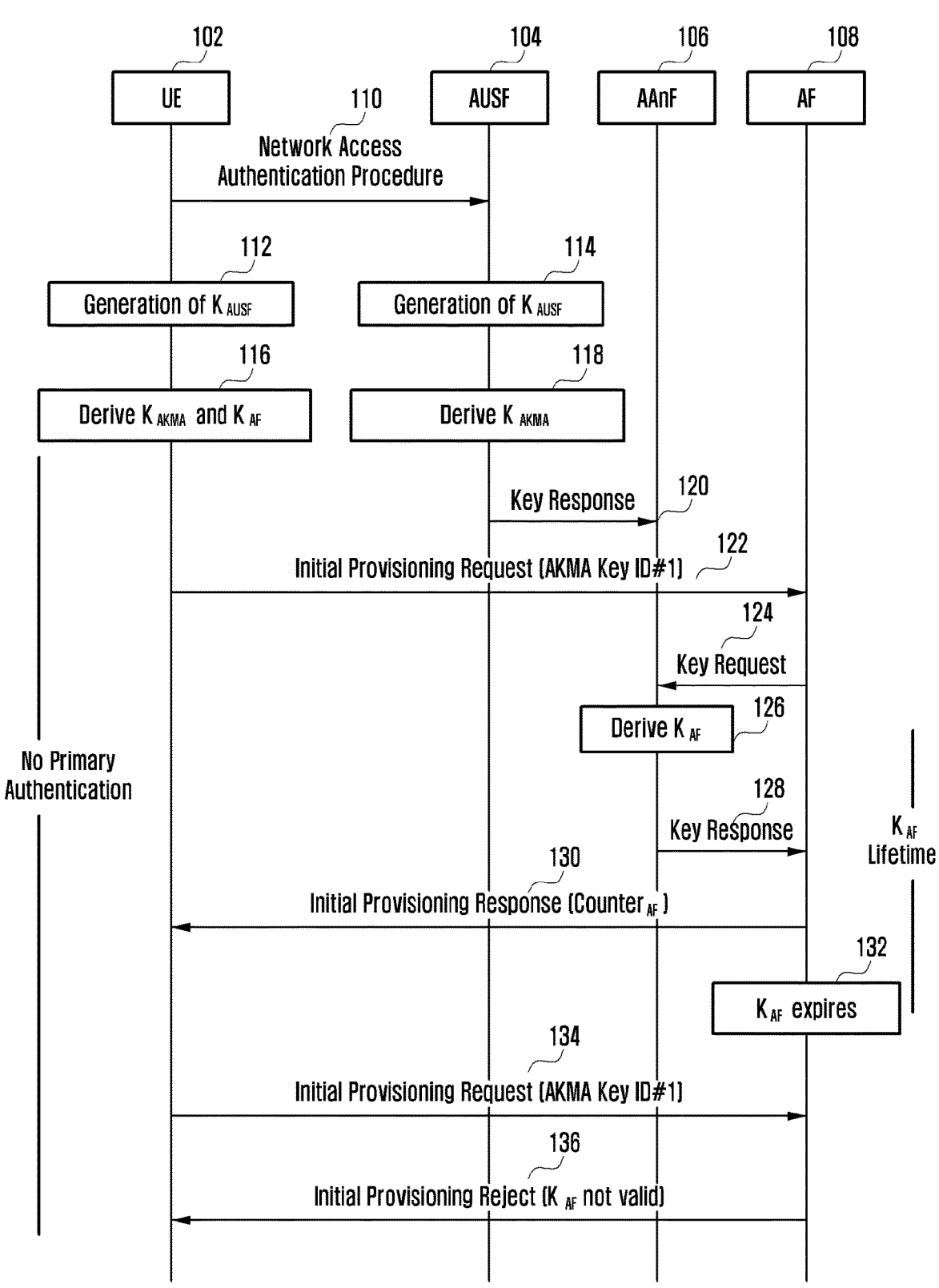

[Fig. 2]
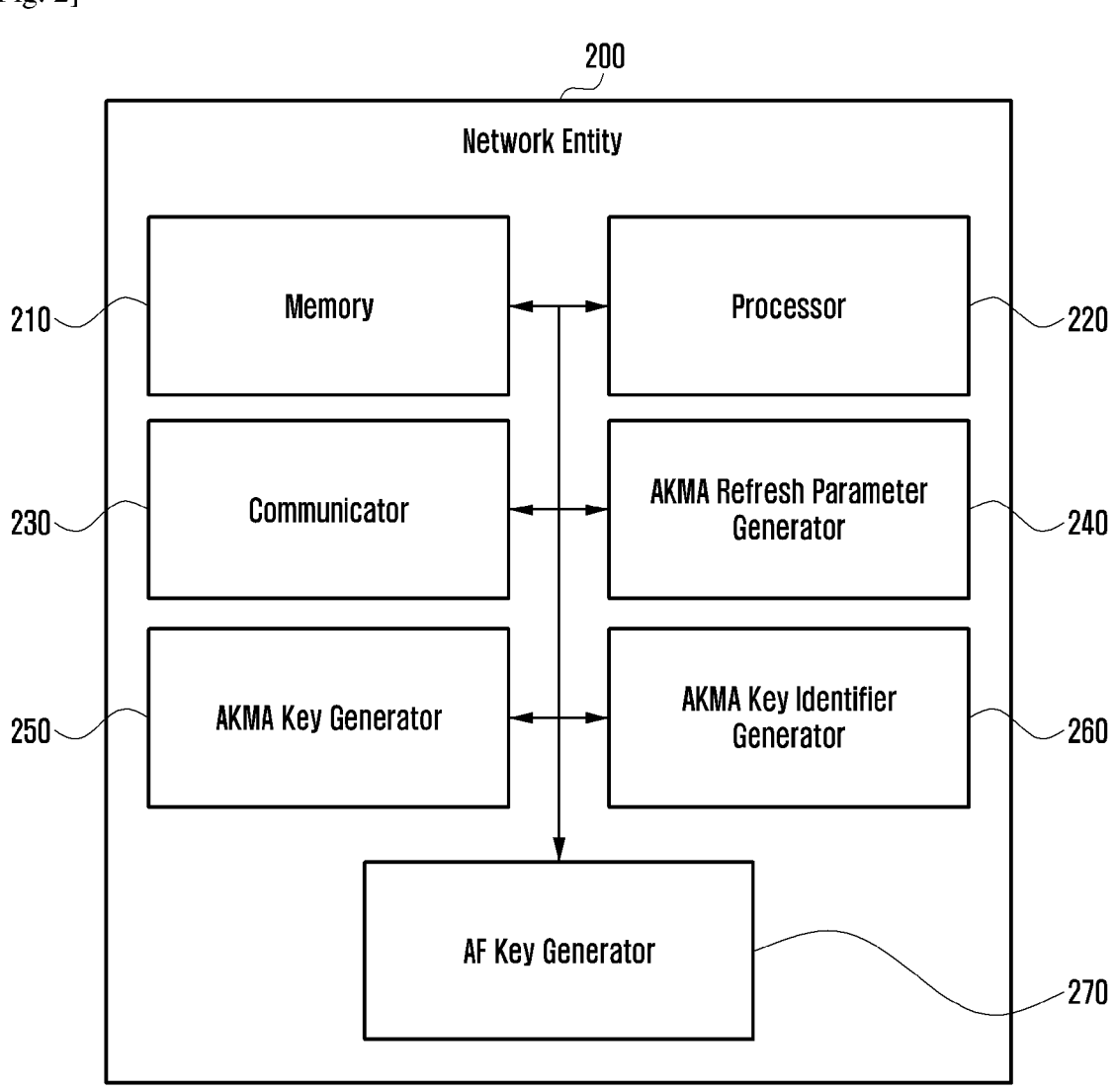

[Fig. 3]
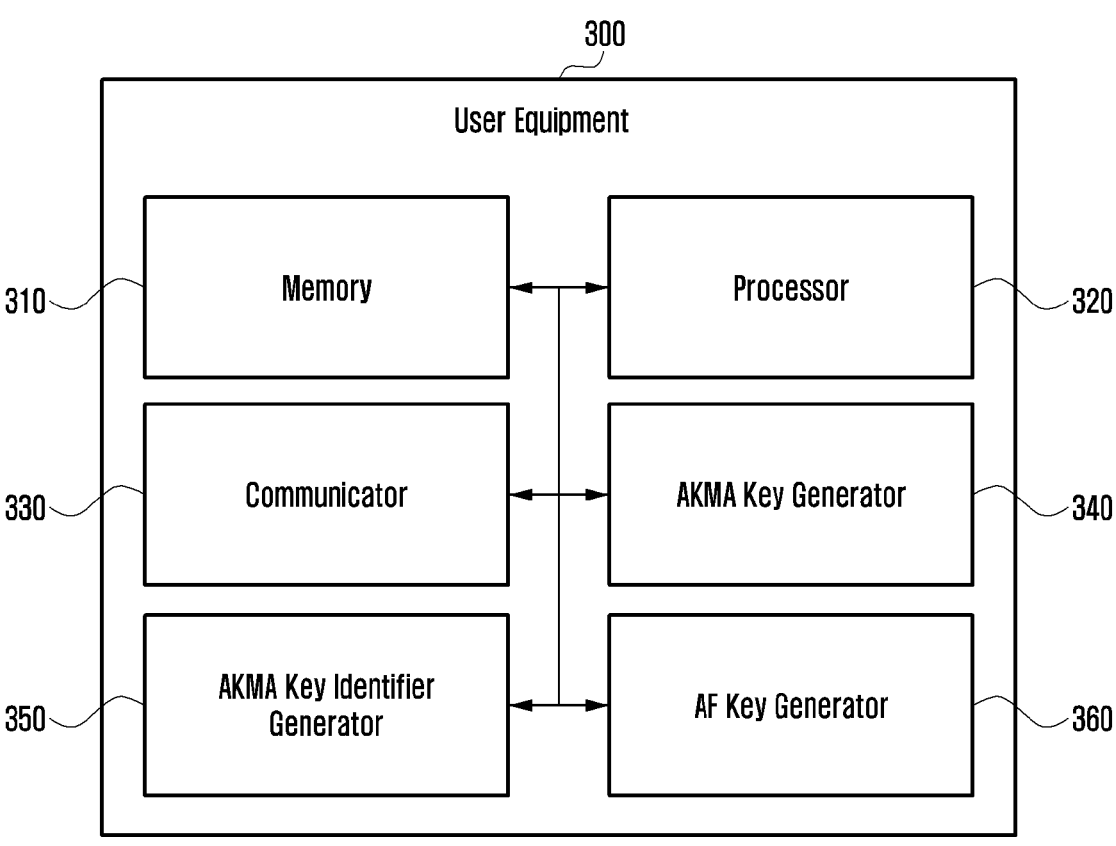

[Fig. 4A]

400

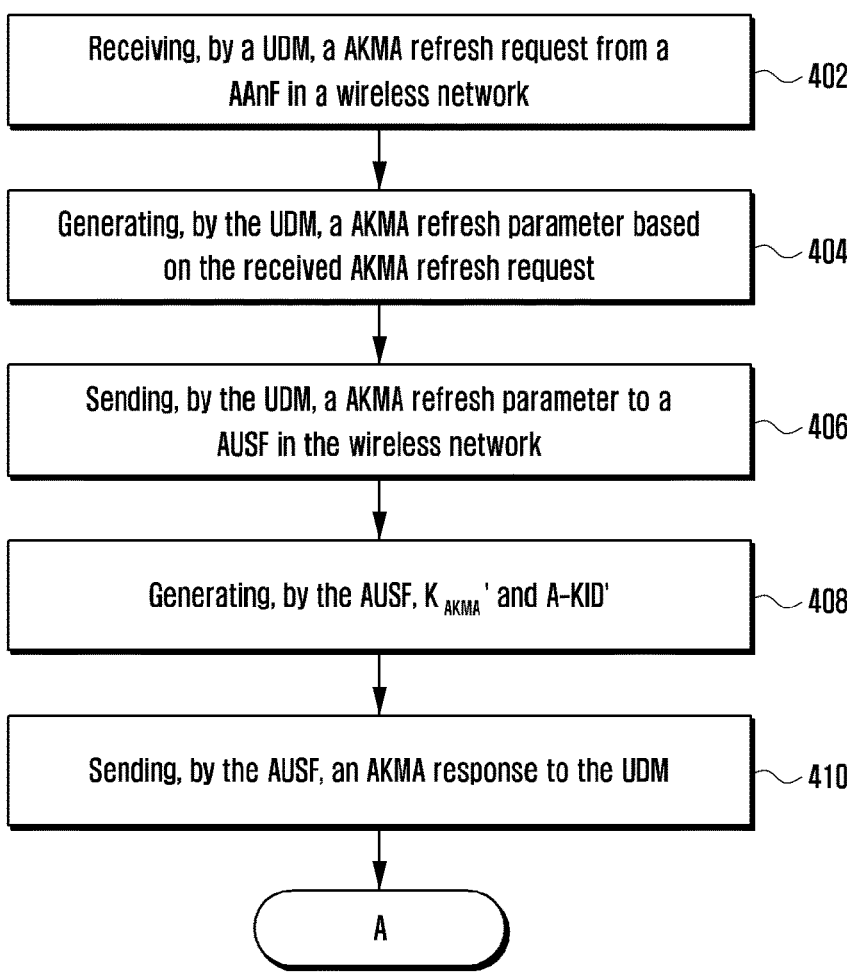

Receiving, by a UDM, a AKMA refresh request from a AAnF in a wireless network ~402

Generating, by the UDM, a AKMA refresh parameter based on the received AKMA refresh request ~404

Sending, by the UDM, a AKMA refresh parameter to a AUSF in the wireless network ~406

Generating, by the AUSF, $K_{AKMA}'$ and A-KID' ~408

Sending, by the AUSF, an AKMA response to the UDM ~410

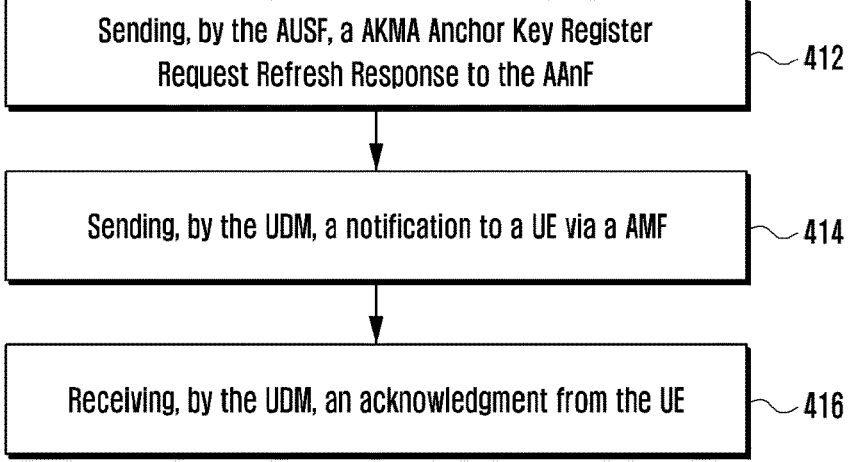

Sending, by the AUSF, a AKMA Anchor Key Register Request Refresh Response to the AAnF ~412

Sending, by the UDM, a notification to a UE via a AMF ~414

Receiving, by the UDM, an acknowledgment from the UE ~416

[Fig. 4C]
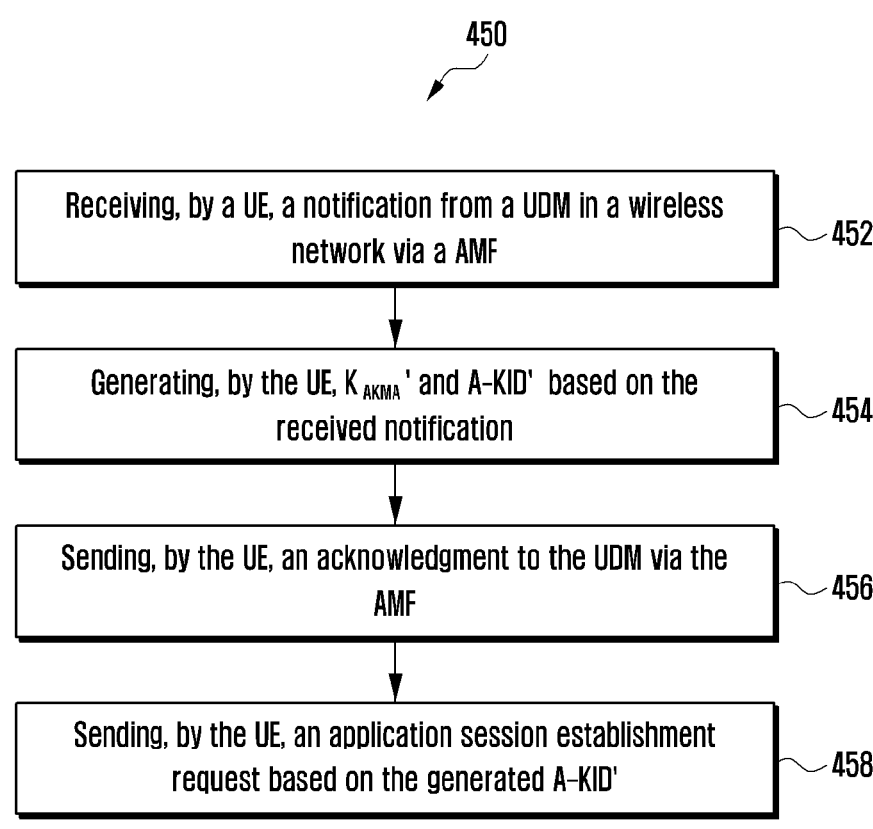
450
Receiving, by a UE, a notification from a UDM in a wireless network via a AMF — 452
Generating, by the UE, $K_{AKMA}'$ and A-KID' based on the received notification — 454
Sending, by the UE, an acknowledgment to the UDM via the AMF — 456
Sending, by the UE, an application session establishment request based on the generated A-KID' — 458

[Fig. 5]
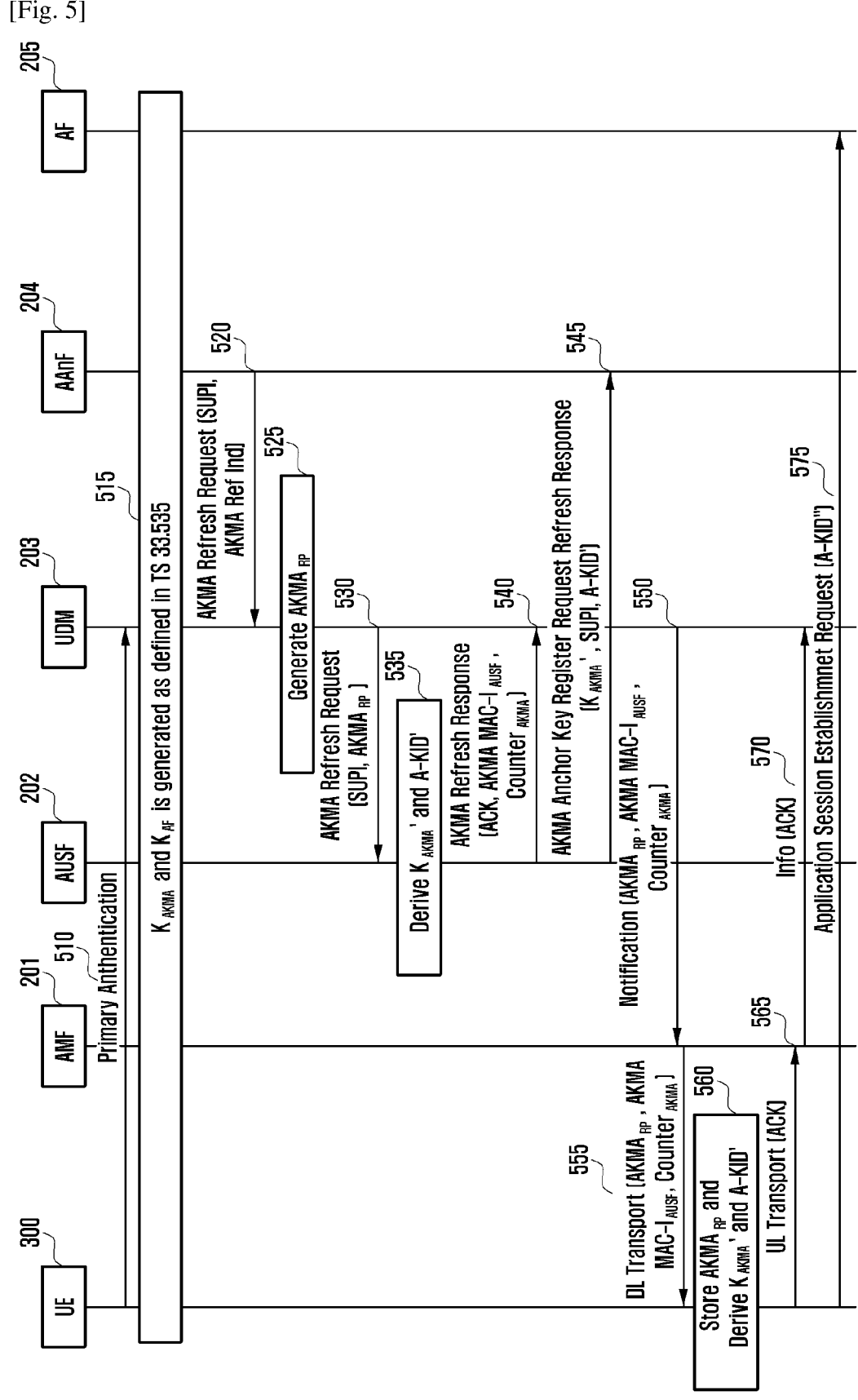

[Fig. 6]
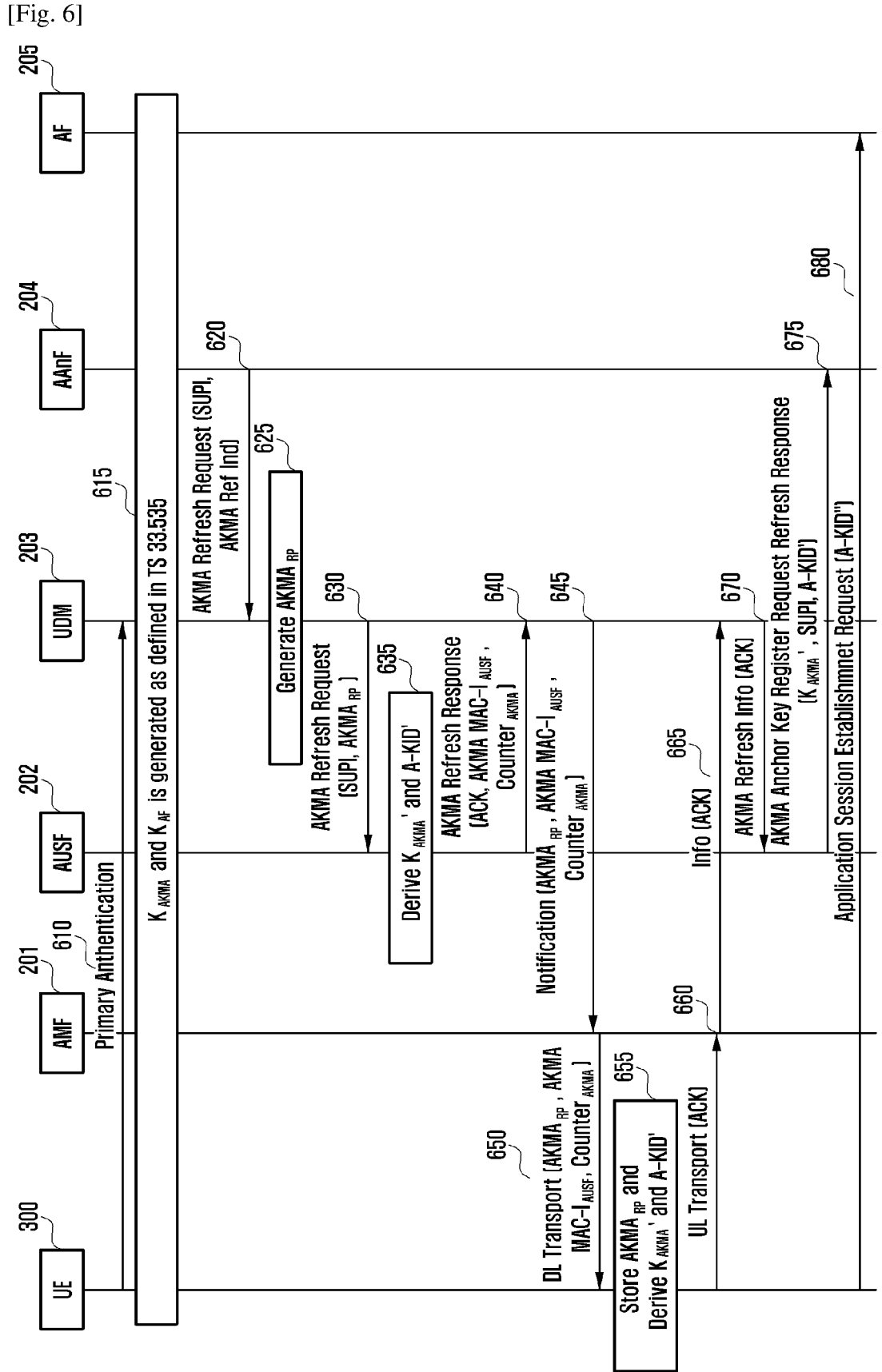

[Fig. 7]
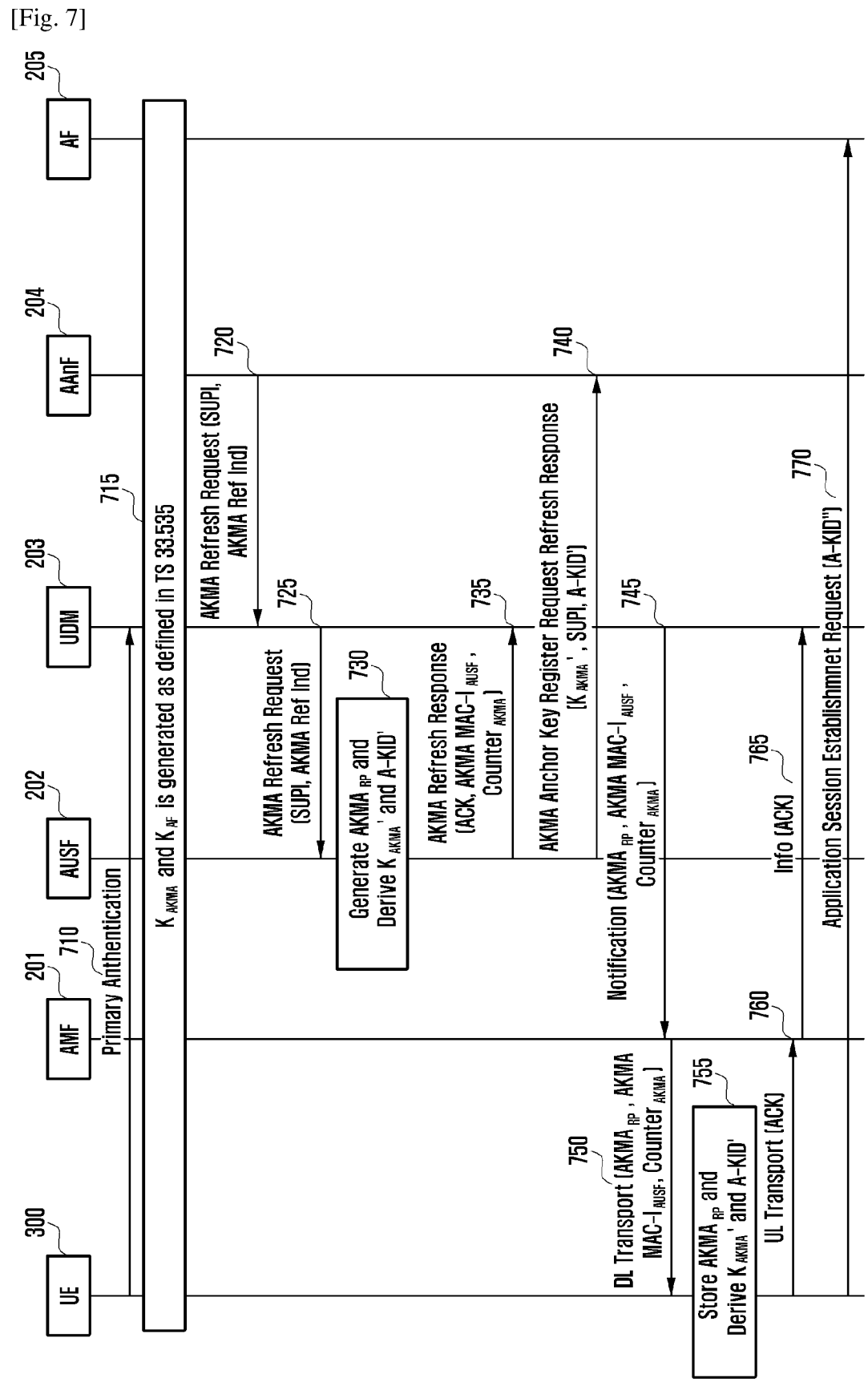

[Fig. 8]
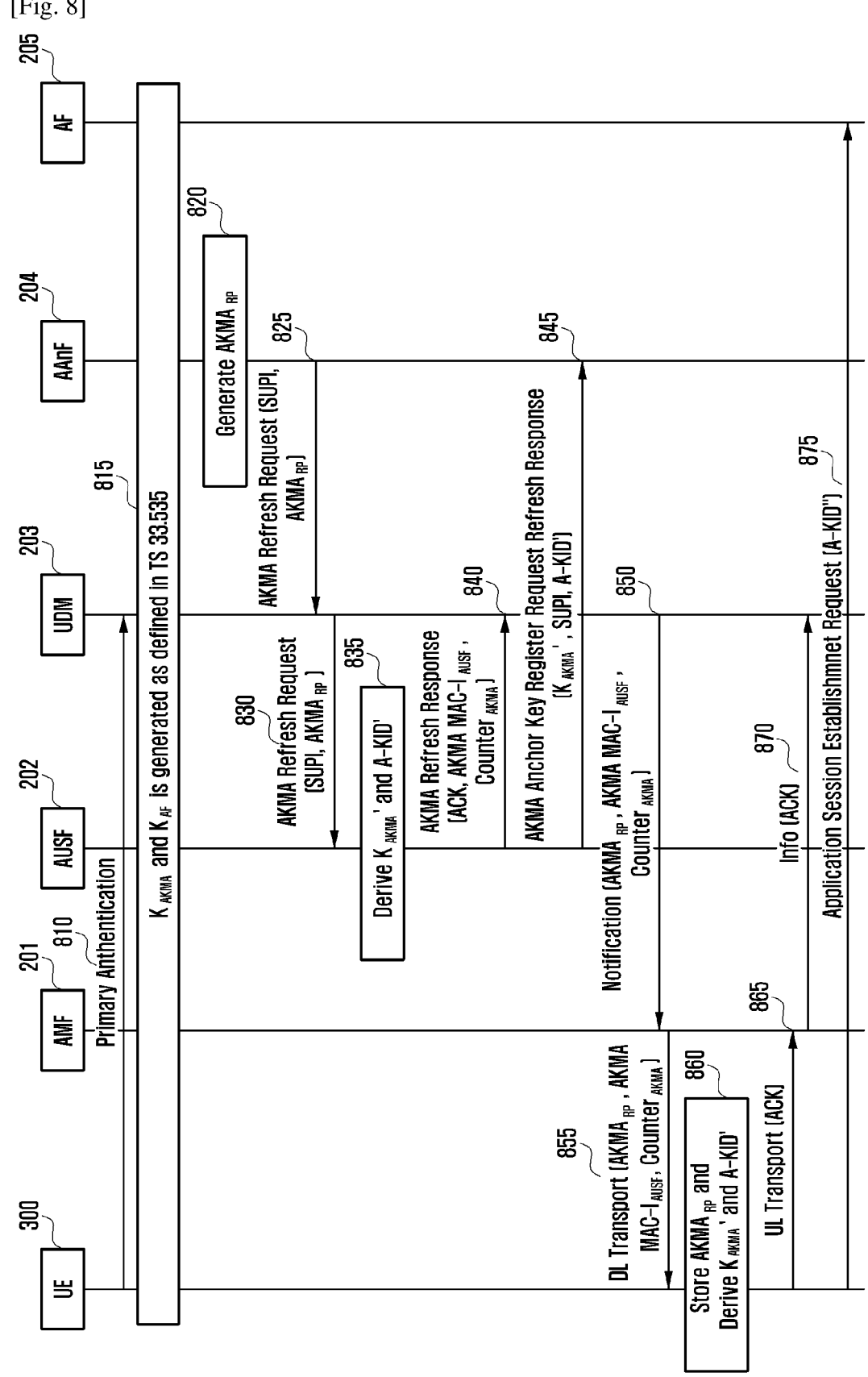

[Fig. 9]
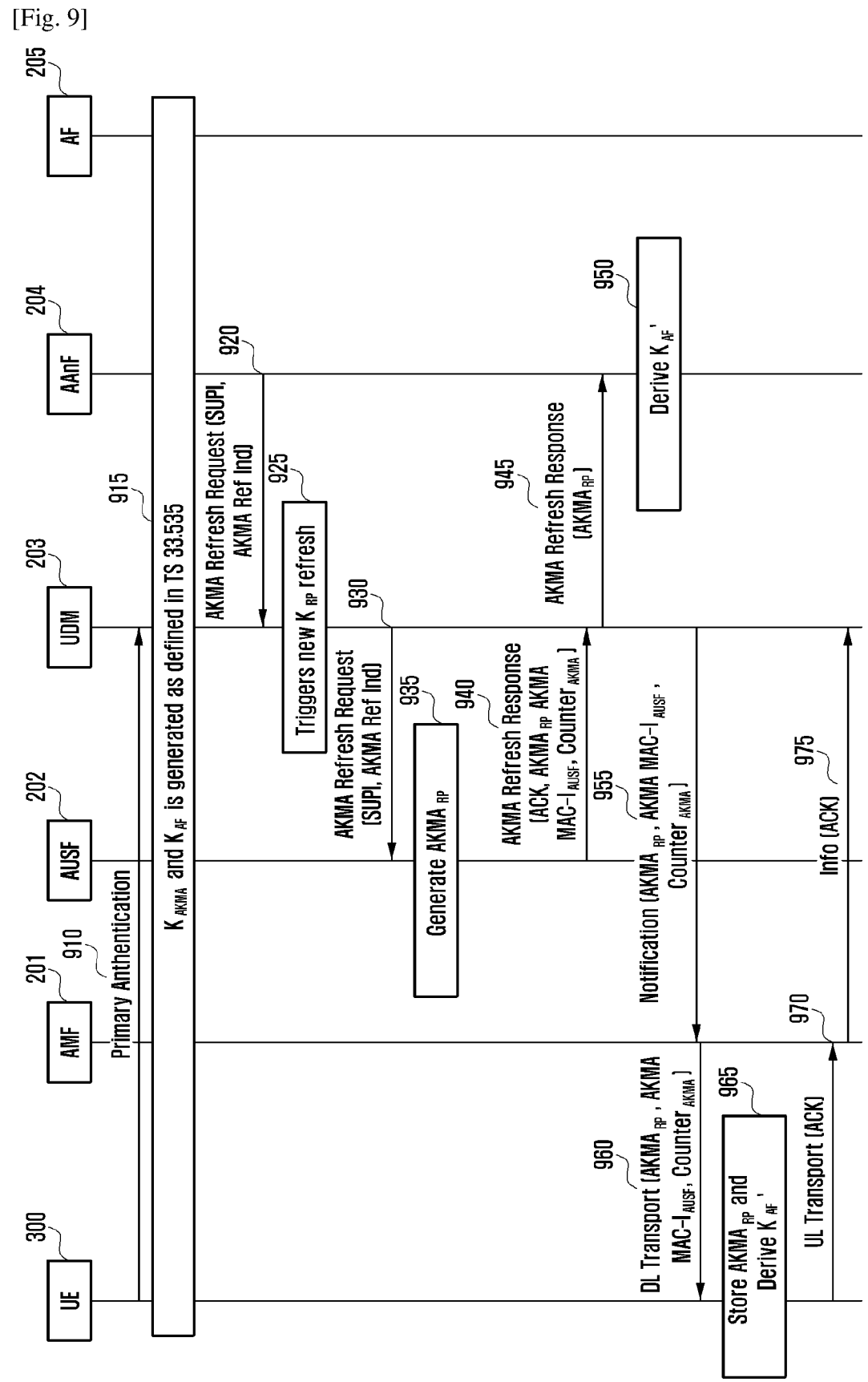

[Fig. 10]
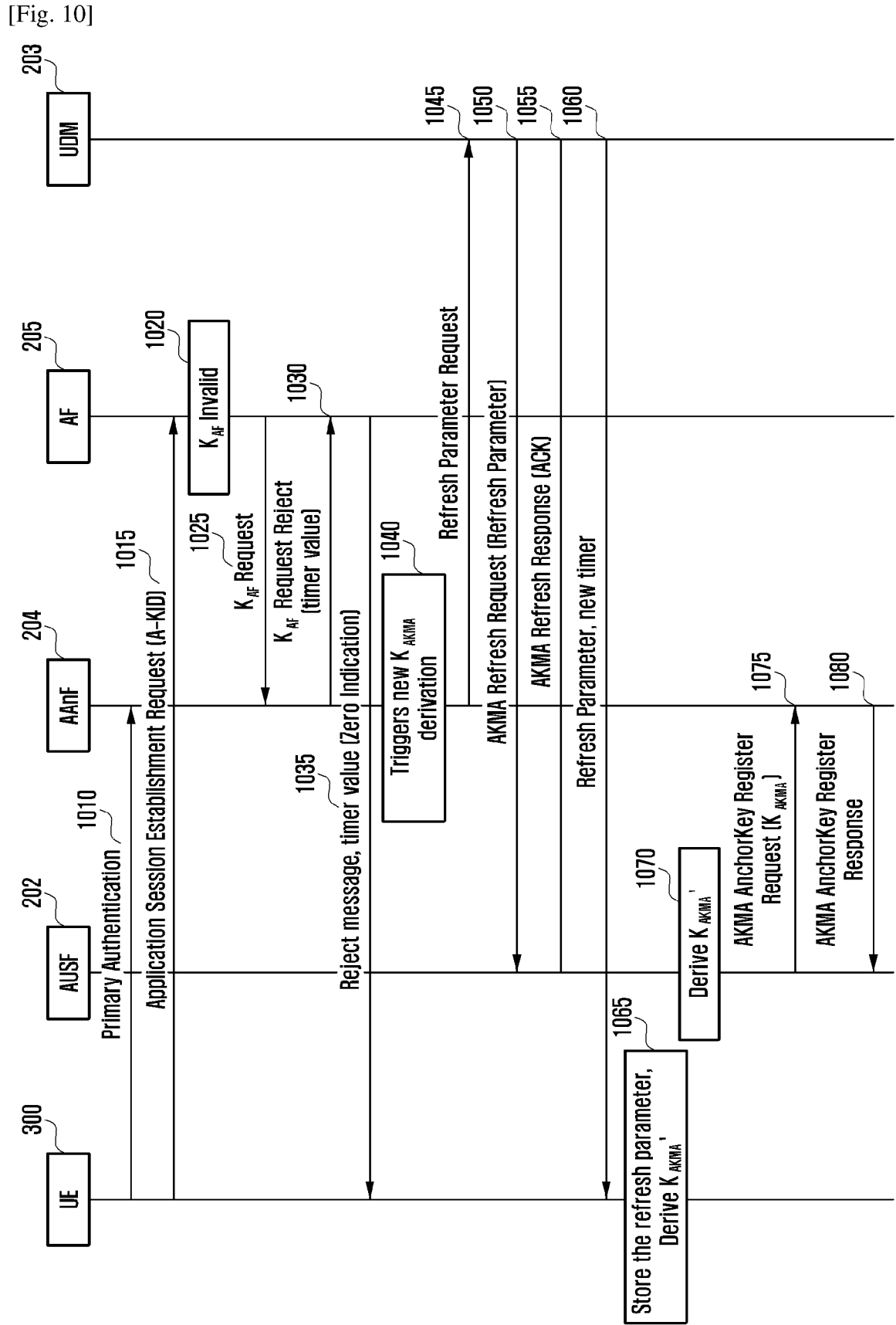

[Fig. 11]
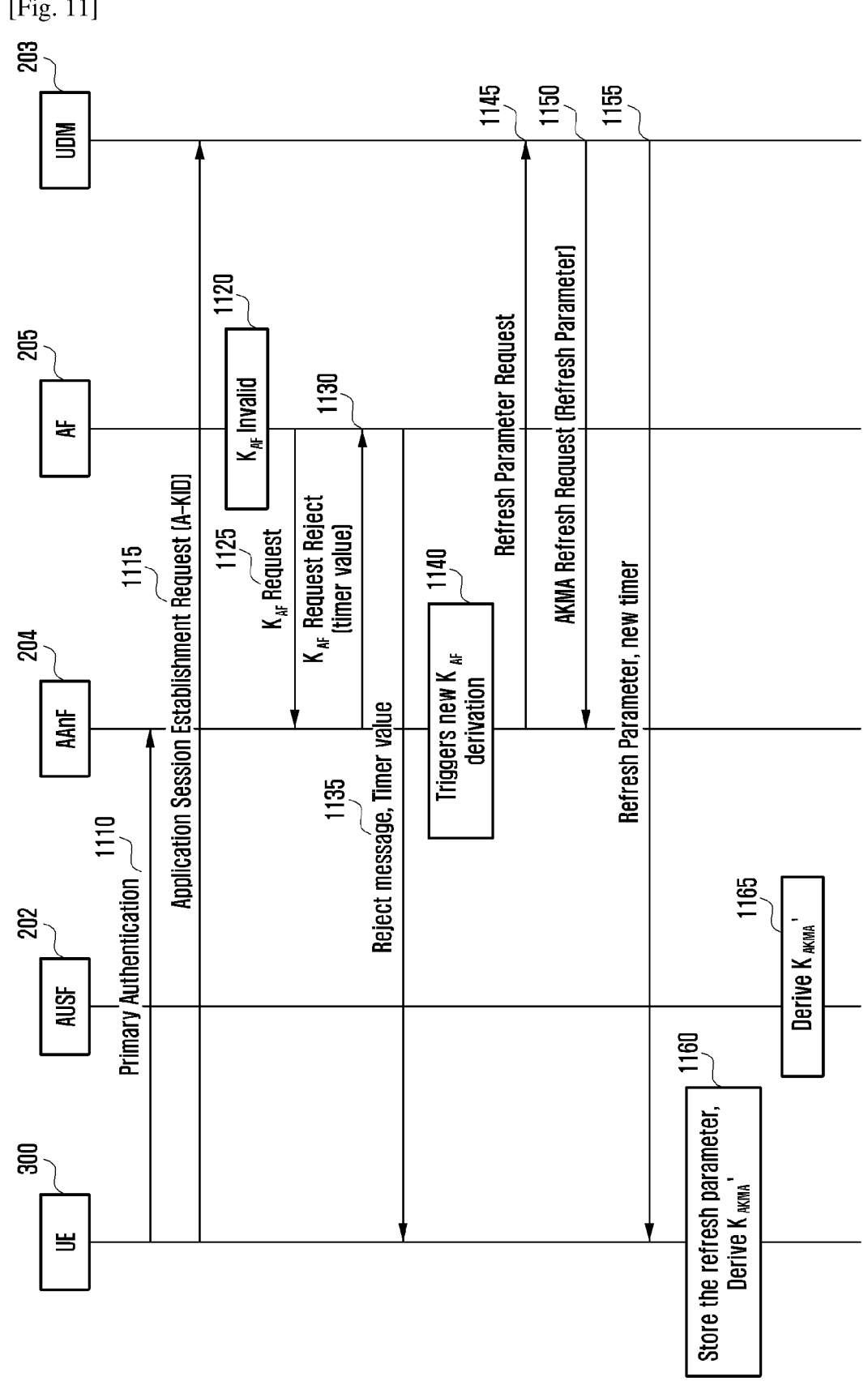

SYSTEM AND METHOD FOR KEY GENERATION IN AUTHENTICATION AND KEY MANAGEMENT FOR APPLICATIONS (AKMA)

CROSS-REFERENCE TO RELATED APPLICATIONS

This application is a 371 National Stage of International Application No. PCT/KR2022/009835 filed Jul. 7, 2022, which claims priority to Indian patent application Ser. No. 20/214,1030717 filed Jul. 8, 2021 and Indian patent application Ser. No. 20/214,1030717 filed Jun. 13, 2022, the disclosures of which are herein incorporated by reference in their entirety.

TECHNICAL FIELD

The present invention relates generally to an authentication in a wireless network, and more particularly, to a system and method for key generation in Authentication and Key Management for Applications (AKMA).

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

$3^{rd}$ Generation Partnership Project (3GPP) Rel-16 introduces a new feature known as authentication and key management for applications (AKMA) which is based on 3GPP user's credentials in 5G. The AKMA leverages user's Authentication and Key Agreement (AKA) credentials to bootstrap security between a user equipment (UE) and an application function (AF), which allows the UE to securely exchange data with the AF.

According to the 3GPP, an AKMA key ($K_{AKMA}$) is refreshed or a new AKMA key is generated by performing a primary authentication as described in TS 33.535, and a AF key ($K_{AF}$) is refreshed or a new $K_{AF}$ is generated upon generating new $K_{AKMA}$. However, the $K_{AF}$ is associated with a timer which indicates a lifetime of the $K_{AF}$ When the lifetime of the $K_{AF}$ expires, the AF may reject the UE access to the AF. Upon the expiry of the $K_{AF}$ and if there has been a change of AUSF key ($K_{AUSF}$) due to a successful run of the primary authentication, the UE may re-try accessing the AF by using a new AKMA Key Identity (A-KID) derived from a new $K_{AUSF}$.

Thus, the $K_{AF}$ may not be refreshed immediately after the expiry of the lifetime of the $K_{AF}$, until a new primary authentication takes place. Therefore, a user may not be able to use an application (requiring authentication using AKMA) after the $K_{AF}$ expires and until the new primary authentication procedure takes place (which may happen after a very long period of time). However, the $K_{AF}$ should be refreshed when needed by applications that are depending on the $K_{AF}$ and hence a mechanism is required for the AKMA service to request network to provide the refreshing parameters to refresh the AKMA key and the AF key. Further, performing the primary authentication whenever there is a need to generate the new $K_{AF}$ requires a huge effort, as performing the primary authentication is a heavy approach which requires heavy computations and consuming a lot of memory.

As per 3GPP TS 33.535 the $K_{AF}$ can be refreshed over Ua*, however this not only depends on whether Ua* protocol supports such functionality, an operator or application may deliberately not want to implement $K_{AF}$ refresh over Ua*, and rather depend on AKMA validation by the network every time. If the key refresh is supported by the Ua* protocol then key refresh is performed independently, any number of times; which leads to the issue of exploiting the subscription credential(s) in 5G system and issues with lawful interception which is part of the regulatory requirements in certain regions.

The scenario in which the UE and the AAnF is having a KAF and the AF is having old $K_{AF}$ key or the AF derives the new Key based on Ua* protocol, whereas the UE doesn't know that it needs to derive the new key and use the latest key. In such cases the key synchronisation issue can occur, mainly due to misalignment of the context derived at different entities and non-coordination.

Thus, it is desired to address the above mentioned disadvantages or other shortcomings or at least provide a useful alternative.

DISCLOSURE OF INVENTION

Technical Problem

The principal object of the embodiments herein is to provide a method of generating new Authentication and Key Management for Application (AKMA) key in a wireless network.

Another object of embodiments herein is to provide a system for generating at least one new Authentication and Key Management for Application (AKMA) key in a wireless network.

Another object of embodiments herein is to provide a system and method for Application key ($K_{AF}$) refresh by requesting the network to provide a refresh parameter to the UE on expiration or about to expire of application key $K_{AF}$.

Another object of embodiment herein is to provide a system and method to avoid the key synchronization issue when the key is refreshed either at UE or at network side.

Furthermore, the proposed method is used to support a mechanism to address the Key synchronisation issue at a User Equipment (UE) side.

Solution to Problem

Accordingly, the embodiment herein is to provide a method performed by a Unified Data Management (UDM) in a wireless network for generating new Authentication and Key Management for Application (AKMA) key. The method includes receiving, by the UDM, a first request from a AKMA Anchor Function (AAnF) in the wireless network, where the first request includes a AKMA refresh request indication, and Subscription Permanent Identifier (SUPI) associated with User Equipment (UE) in the wireless network, wherein the first request indicates a request for generating the new AKMA key to establish communication between the User Equipment (UE) and at least one Application Function (AF) in the wireless network. The method also comprises generating, by the UDM, an AKMA refresh parameter ($AKMA_{RP}$) based on the received first request. The method further comprises sending, by the UDM, the generated AKMA refresh parameter ($AKMA_{RP}$) along with the at least one SUPI to an Authentication Server Function (AUSF) in the wireless network for generating the at least one new AKMA key.

Accordingly the embodiment herein is to provide a method of generating new Authentication and Key Management for Application (AKMA) key by an Authentication Server Function (AUSF) in a wireless network. The method comprises receiving, by the AUSF, a first request from a Unified Data Management (UDM) in the wireless network, wherein the first request comprises a AKMA refresh parameter ($AKMA_{RP}$), and at least one Subscription Permanent Identifier (SUPI) associated with User Equipment (UE) in the wireless network, and wherein the first request indicates a request to generate the at least one new AKMA key for establishing communication between the UE and at least one Application Function (AF) in the wireless network. The method also comprises generating, by the AUSF, the at least one new AKMA key and associated new AKMA Key Identifier based on the received first request. The method further comprises sending, by the AUSF, the generated at least one new AKMA key to an AKMA Anchor Function (AAnF) in the wireless network, wherein the AAnF is associated with the at least one AF.

Accordingly the embodiment herein is to provide a method of generating new Authentication and Key Management for Application (AKMA) key by a User Equipment (UE) in a wireless network. The method comprises receiving, by the User Equipment (UE), a first request from a Unified Data Management (UDM) in the wireless network, wherein the first request comprises a Authentication and Key Management for Application (AKMA) refresh parameter ($AKMA_{RP}$), and wherein the first request indicates a request to generate the at least one new AKMA key for establishing communication between the User Equipment (UE) and at least one Application Function (AF) in the wireless network. The method also comprises generating, by the User Equipment (UE), the at least one new AKMA key and associated new AKMA Key Identifier based on the received first request. The method further comprises sending, by the User Equipment (UE), an second request based on the generated at least one new AKMA key, wherein the second request is an application session establishment request for establishing the communication between the User Equipment (UE) and the at least one Application Function (AF).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Advantageous Effects of Invention

Embodiments of the present disclosure provides methods and apparatus for refreshing AKMA key and AF key without performing a primary authentication.

Embodiments of the present disclosure provides methods and apparatus for avoiding the key synchronization issue by defining a method where the AKMA Key ID indicates to the refreshed key.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 1 illustrates a scenario of sequence flow of a method for establishing communication between a user equipment (UE) and an application function (AF), according to the prior arts;

FIG. 2 illustrates a block diagram of a network entity for generating a new AKMA key and a new AF key, according to the embodiments as disclosed herein;

FIG. 3 illustrates a block diagram of a user equipment for generating the new AKMA key and the new AF key, according to the embodiments as disclosed herein;

FIGS. 4A and 4B are flow diagrams illustrating various operations implemented by the network entity for generating the new AKMA Key and the new AF Key, according to the embodiments as disclosed herein;

FIG. 4C is a flow diagram illustrating various operations implemented by the UE for generating the new AKMA Key and the new AF Key, according to the embodiments as disclosed herein;

FIG. 5 is an example sequential flow diagram illustrating generation of the new AKMA Key and associated AKMA Key Identifier, according to the embodiments as disclosed herein;

FIG. 6 is another example sequential flow diagram illustrating generation of the new AKMA key and associated AKMA Key Identifier, according to the embodiments as disclosed herein;

FIG. 7 is yet another example sequential flow diagram illustrating generation of the new AKMA Key and associated AKMA Key Identifier, according to the embodiments as disclosed herein;

FIG. 8 is yet another example sequential flow diagram illustrating generation of the new AKMA Key and associated AKMA Key Identifier, according to the embodiments as disclosed herein;

FIG. 9 is an example sequential flow diagram illustrating generation of a new AF Key, according to the embodiments as disclosed herein;

FIG. 10 is an example sequential flow diagram illustrating generation of the new AKMA Key based on a timer, according to the embodiments as disclosed herein; and FIG. 11 is an example sequential flow diagram illustrating generation of the new AF Key based on a timer, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semi-conductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The terms "electronic device", "user equipment", and "UE" mean the same and are used interchangeably throughout this document.

Accordingly the embodiment herein is to provide a method of generating new Authentication and Key Management for Application (AKMA) key by an Authentication Server Function (AUSF) in a wireless network. The method comprises receiving, by the AUSF, a first request from a Unified Data Management (UDM) in the wireless network, wherein the first request comprises a AKMA refresh parameter ($AKMA_{RP}$), and at least one Subscription Permanent Identifier (SUPI) associated with at least one User Equipment (UE) in the wireless network, and wherein the first request indicates a request to generate the at least one new AKMA key for establishing communication between the at least one User Equipment (UE) and at least one Application Function (AF) in the wireless network. The method also comprises generating, by the AUSF, the at least one new AKMA key and associated new AKMA Key Identifier based on the received first request. The method further comprises sending, by the AUSF, the generated at least one new AKMA key to an AKMA Anchor Function (AAnF) in the wireless network, wherein the AAnF is associated with the at least one AF.

In the conventional methods and systems, the AF key ($K_F$) may not be refreshed immediately after its lifetime expiry, until a new primary authentication takes place. This means a user may not be able to use an application (requiring authentication using AKMA) after the $K_{AF}$ expires and until a new primary authentication procedure takes place (which may happen after a very long period of time). However, the $K_{AF}$ should be refreshed when needed by the applications that are depending on the $K_{AF}$ and hence a mechanism is required for the AKMA service to request the network to provide the refreshing parameters to refresh the AKMA key and the AF key. Further, performing primary authentication whenever there is a need to generate a new $K_{AF}$ requires a huge effort, as performing the primary authentication is a heavy approach. Unlike to the conventional methods and systems, in the present disclosure the new AF key is generated without requiring to perform any primary authentication.

Referring now to the drawings and more particularly to FIGS. 1 through 11, where similar reference characters denote corresponding features consistently throughout the figures, there are shown preferred embodiments.

FIG. 1 illustrates a scenario of sequence flow of a method for establishing communication between a user equipment (UE) and an application function (AF), according to the prior arts. As shown in FIG. 1, at step 110, the UE 102 initiates a network access authentication procedure by making a request to an AUSF 104 to register the UE 102 for the AKMA services. At step 112, when the network access authentication procedure is completed, the UE 102 generates an AUSF key ($K_{AUSF}$). Similarly, at step 114, the AUSF 104 also generates the AUSF key ($K_{AUSF}$). At step 116, the UE 102 derives an AKMA key ($K_{AKMA}$) 116 based on the KAUSF generated. The UE 102 then derives an AF key ($K_{AF}$) using the $K_{AKMA}$. Similarly, at step 118, the AUSF 104 derives $K_{AKMA}$ based on the $K_{AUSF}$ generated. Upon the $K_{A}$IA is derived, at step 120, the AUSF 104 sends a key response to an AAnF 106. At step 122, the UE 102 then initiates an application session establishment request using A-KID1 112. At step 124, the AF 108 upon receiving the application session establishment request from the UE 102 will send a key request to the AAnF 106. At step 126, the AAnF 10 then derives the $K_{AF}$ 126 using the A-KID1. At step 128, the AAnF 106, upon generating the $K_{AF}$, sends a key response to the AF 108. At step 130, the AF 108 sends an initial provisioning response which includes $Counter_{AF}$ to the UE 102. Upon the expiry of $K_{AF}$, at step 132 and 134, when the UE 102 send the initial provisioning request using the previous A-KID1, the AF 108 rejects the request as the $K_{AF}$ associated with A-KID is not valid. At step 136, the AF 108 cannot provide application access to the UE 102 and a new $K_{AF}$ for the AF cannot be generated until next primary authentication takes place as per conventional method. Thus, the UE 102 may not be able to use an application requiring the AKMA service from the AF 108.

FIG. 2 illustrates a block diagram of the network entity 200 for generating a new AKMA key and a new AF key, according to the embodiments as disclosed herein. In an embodiment, the network entity 200 includes a memory 210, a processor 220, a communicator 230, a AKMA refresh parameter generator 240, a AKMA key generator 250, a AKMA key identifier generator 260, and a AF key generator 280. In an embodiment, the network entity 200 comprises an AMF 201, an AUSF 202, a UDM 203, an AAnF 204, and an AF 205 (not shown in the FIG. 2). In another embodiment, the network entity 200 can be one of the AMF 201, the AUSF 202, the UDM 203, the AAnF 204, and the AF 205.

The memory 210 also stores instructions to be executed by the processor 220. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. In certain examples, a non-transitory storage medium may store data that can, over time, change (e.g., in Random Access Memory (RAM) or cache). In an embodiment, the memory 210 can be an internal storage unit or it can be an external storage unit of the network entity 200, a cloud storage, or any other type of external storage.

The processor 220 communicates with the memory 210, the communicator 230, the AKMA refresh parameter generator 240, the AKMA key generator 250, the AKMA key identifier generator 260, and the AF key generator 270. The processor 220 is configured to execute instructions stored in the memory 210 and to perform various processes. The communicator 230 is configured for communicating internally between internal hardware components and with external devices via one or more networks.

In an embodiment, the AKMA refresh parameter generator 240 generates an AKMA refresh parameter ($AKMA_{RP}$). The $AKMA_{RP}$ can be generated by one of the AUSF 202, the UDM 203, and the AAnF 204 based on an AKMA refresh indication request received. In one embodiment, the $AKMA_{RP}$ can be a random (RAND) value, a $Counter_{AKMA}$, and a $Counter_{AF}$ value.

In an embodiment, the AKMA key generator 250 generates a new AKMA key ($K_{AKMA}'$). The AKMA key generator 250 generates the new AKMA key ($K_{AKMA}'$) based on an AKMA, an AUSF key ($K_{AUSF}$), an AKMA refresh parameter ($AKMA_{RP}$), and at least one SUPI associated with a UE 102. In one embodiment, the new AKMA key ($K_{AKMA}'$) is generated by inputting the AKMA, the AUSF key ($K_{AUSF}$), the AKMA refresh parameter ($AKMA_{RP}$), and the at least one SUPI associated with the UE 102 to a key distribution function (KDF) as shown in eq. (1).

$$K_{AKMA}'=KDF(SUPI, K_{AUSF}, "AKMA", AKMA_{RP}) \quad (1)$$

In an embodiment, the AKMA key identifier generator 260 generates a new AKMA key identifier (A-KID'). The AKMA key identifier generator 260 generates the new AKMA key identifier (A-KID') by generating a new AKMA temporary identifier (A-TID'). The AKMA key identifier generator 260 generates the new AKMA temporary identifier (A-TID') based on the AUSF key ($K_{AUSF}$), a present AKMA temporary identifier (A-TID), the AKMA refresh parameter ($AKMA_{RP}$), and the at least one SUPI associated with UE 300 102. In one embodiment, the AKMA key identifier generator 260 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with UE 300 to the KDF as shown in eq. (2).

$$A\text{-}TID'\text{=}KDF(\text{"}A\text{-}TID\text{"},K_{AUSF},AKMA_{RP},SUPI) \qquad (2)$$

In an embodiment, the AF key generator 270 generates a new Application Function (AF) key. The AF key generator 270 generates the new Application Function (AF) key based on the AKMA key ($K_{AKMA}$), an identifier of at least one AF (AF-ID), and the AKMA refresh parameter ($AKMA_{RP}$). In one embodiment, the AF key generator 280 generates the new Application Function (AF) key ($K_{AF}$) by inputting at least one of the AKMA key ($K_{AKMA}$), the identifier of at least one AF (AF-ID), and the AKMA refresh parameter ($AKMA_{RP}$) to the KDF as shown in eq. (3).

$$K_{AF}'\text{=}KDF(K_{AKMA},AF\text{-}ID,AKMA_{RP}) \qquad (3)$$

Although the FIG. 2 shows various hardware components of the network entity 200 but it is to be understood that other embodiments are not limited thereon. In other embodiments, the network entity 200 may include less or more number of components. Further, the labels or names of the components are used only for illustrative purpose and does not limit the scope of the invention. One or more components can be combined together to perform same or substantially similar function to generate the new AKMA key and the new AF key for establishing communication between the UE 102 and the AF 205 in the wireless network.

FIG. 3 illustrates a block diagram of the UE 300 for generating the new AKMA key and the new AF key, according to the embodiments as disclosed herein. In an embodiment, the user equipment 300 includes a memory 310, a processor 320, a communicator 330, an AKMA key generator 340, an AKMA key identifier generator 350, and an AF key generator 360.

The memory 310 also stores instructions to be executed by the processor 320. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory. In certain examples, a non-transitory storage medium may store data that can, over time, change (e.g., in Random Access Memory (RAM) or cache). In an embodiment, the memory 310 can be an internal storage unit or it can be an external storage unit of the User Equipment (UE) 300, a cloud storage, or any other type of external storage.

The processor 320 communicates with the memory 310, the communicator 330, the AKMA key generator 340, the AKMA key identifier generator 350, and the AF key generator 380. The processor 320 is configured to execute instructions stored in the memory 310 and to perform various processes. The communicator 330 is configured for communicating internally between internal hardware components and with external devices via one or more networks.

In an embodiment, the AKMA key generator 340 generates a new AKMA key ($K_{AKMA}'$). The AKMA key generator 360 generates the new AKMA key ($K_{AKMA}'$) based on an AKMA, an AUSF key ($K_{AUSF}$), an AKMA refresh parameter ($AKMA_{RP}$), and at least one SUPI associated with the UE 300. In one embodiment, the new AKMA key ($K_{AKMA}'$) is generated by inputting the AKMA, the AUSF key ($K_{AUSF}$), the AKMA refresh parameter ($AKMA_R$), and the at least one SUPI associated with the UE 300 to a key distribution function (KDF) as shown in eq. (1).

In an embodiment, the AKMA key identifier generator 350 generates a new AKMA key identifier (A-KID'). The AKMA key identifier generator 370 generates the new AKMA key identifier (A-KID') by generating a new AKMA temporary identifier (A-TID'). The AKMA key identifier generator 370 generates the new AKMA temporary identifier (A-TID') based on the AUSF key ($K_{AUSF}$), the present AKMA temporary identifier (A-TID), the AKMA refresh parameter ($AKMA_{RP}$), and the at least one SUPI associated with the UE 300. In one embodiment, the AKMA key identifier generator 370 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with the UE 300 to the KDF as shown in eq. (2).

In an embodiment, the AF key generator 360 generates a new Application Function key ($K_{AF}'$). The AF key generator 360 generates the new Application Function ($K_{AF}'$) key based on the new AKMA key ($K_{AKMA}'$), an identifier of the AF 205 (AF-ID), and the AKMA refresh parameter ($AKMA_{RP}$). In one embodiment, the AF key generator 360 generates the new Application Function ($K_{AF}'$) key by inputting at least one of the new AKMA key ($K_{AKMA}'$), the identifier of at least one AF (AF-ID), and the AKMA refresh parameter ($AKMA_{RP}$) to the KDF as shown in eq. (3).

Although the FIG. 3 shows various hardware components of the user equipment 300 but it is to be understood that other embodiments are not limited thereon. In other embodiments, the user equipment 300 may include less or more number of components. Further, the labels or names of the components are used only for illustrative purpose and does not limit the scope of the invention. One or more components can be combined together to perform same or substantially similar function to generate the new AKMA key and the new AF key for establishing communication between the UE 300 and the application function (AF) in the wireless network.

FIGS. 4A and 4B are flow diagrams illustrating various operations implemented by the network entity 200 for generating the new AKMA Key and the new AF Key, according to the embodiments as disclosed herein.

At 402, the method includes receiving, by the UDM 203, the AKMA refresh request from the AAnF 204. In one embodiment, the AKMA refresh request received from the AAnF 204 includes an AKMA refresh indicator and the at least one SUPI associated with the at least one user equipment (UEL) 300.

At block 404, the method includes generating, by the UDM 203, an AKMA refresh parameter based on the received AKMA refresh request. In one embodiment, the AKMA refresh parameter generator 240 generates the AKMA refresh parameter ($AKMA_{RP}$). The $AKMA_{RP}$ can be generated by one of the AUSF 202, the UDM 203, and the AAnF 204 based on the AKMA refresh indication request received. In one embodiment, the $AKMA_{RP}$ can be at least one of the random (RAND) value, the $Counter_{AKMA}$, and the $Counter_{AF}$ value.

At block 406, the method includes sending, by the UDM 203, the AKMA refresh parameter ($AKMA_{RP}$) to the AUSF 202. In one embodiment, the UDM 203 sends the AKMA refresh parameter ($AKMA_{RP}$) along with the at least one SUPI associated with the UE 300 300 to the AUSF 202.

At block 408, the method includes generating, by the AUSF 202, the new AKMA key ($K_{AKMA}'$) and associated new AKMA key identifier (A-KID'). In an embodiment, the AKMA key generator 250 generates the new AKMA key ($K_{AKMA}'$). The AKMA key generator 250 generates the new AKMA key ($K_{AKMA}'$) based on the AKMA, the AUSF key ($K_{AUSF}$), the AKMA refresh parameter ($AKMA_{RP}$), and the at least one SUPI associated with the UE 300. In one embodiment, the new AKMA key ($K_{AKMA}'$) is generated by inputting the AKMA, the AUSF key ($K_{AUSF}$), the AKMA refresh parameter ($AKMA_{RP}$), and the at least one SUPI associated with the UE 300 to the KDF as shown in eq. (1). Further, in another embodiment, the AKMA key identifier generator 260 generates the new AKMA key identifier (A-KID'). The AKMA key identifier generator 260 generates the new AKMA key identifier (A-KID') by generating the new AKMA temporary identifier (A-TID'). The AKMA key identifier generator 260 generates the new AKMA temporary identifier (A-TID') based on the AUSF key ($K_{AUSF}$), the present AKMA temporary identifier (A-TID), the AKMA refresh parameter ($AKMA_{RP}$), and the at least one SUPI associated with the UE 300. In one embodiment, the AKMA key identifier generator 260 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with the UE 300 to the KDF as shown in eq. (2).

At block 410, the method includes sending, by the AUSF 202, an AKMA response to the UDM 203. In one embodiment, the AUSF 202 sends the AKMA refresh response to the UDM 203. The AKMA refresh response includes an acknowledgment for the AKMA refresh request received from the UDM 203. The AKMA refresh response also includes AKMA MAC-I$_{AUSF}$ and $Counter_{AKMA}$.

At block 412, the method includes sending, by the AUSF 202, an AKMA Anchor Key Register Request Refresh Response to the AAnF 204. In one embodiment, the AUSF 202 sends the AKMA Anchor Key Register Request Refresh Response to the AAnF 204. In one embodiment, the AKMA Anchor Key Register Request Refresh Response includes the new AKMA key ($K_{AKMA}'$), the at least one SUPI associated with UE 300, and the new AKMA key identifier (A-KID').

At block 414, the method includes sending, by the UDM 203, a notification to the UE 300 via the AMF 201. In one embodiment, the UDM 203 sends the notification to the UE 300 via the AMF 201. The notification includes at least one of the AKMA refresh parameter ($AKMA_R$), the AKMA MAC-I$_{AUSF}$, and the $Counter_{AKMA}$.

At block 416, the method includes receiving, by the UDM 203, an acknowledgment from the UE 300 via the AMF 201. In one embodiment, the UDM 203 receives the acknowledgment from the UE 300.

FIG. 4C is a flow diagram illustrating various operations implemented by the UE 300 for generating the new AKMA Key and the new AF Key, according to the embodiments as disclosed herein.

At block 452, the method includes receiving, by the UE 300, a notification from the UDM 203. In one embodiment, the UE 300 receives the notification from the UDM 203. In one embodiment, the UE 300 receives the notification from the UDM 203 via the AMF 201. The notification includes at least one of AKMA refresh parameter ($AKMA_{RP}$), AKMA MAC-I$_{AUSF}$, and $Counter_{AKMA}$.

At block 454, the method includes generating, by the UE 300, a new AKMA key and associated AKMA key identifier (A-KID) based on the received notification. In an embodiment, the AKMA key generator 340 generates a new AKMA key ($K_{AKMA}'$). The AKMA key generator 340 generates the new AKMA key ($K_{AKMA}'$) based on the AKMA, the AUSF key ($K_{AUSF}$), the AKMA refresh parameter ($AKMA_{RP}$), and at least one SUPI associated with the UE 300. In one embodiment, the new AKMA key ($K_{AKMA}'$) is generated by inputting the AKMA, the AUSF key ($K_{AUSF}$), the AKMA refresh parameter ($AKMA_R$), and the at least one SUPI associated with the UE 300 to the KDF as shown in eq. (1). Further, in another embodiment, the AKMA key identifier generator 350 generates the new AKMA key identifier (A-KID'). The AKMA key identifier generator 370 generates the new AKMA key identifier (A-KID') by generating the new AKMA temporary identifier (A-TID'). The AKMA key identifier generator 370 generates the new AKMA temporary identifier (A-TID') based on the AUSF key ($K_{AUSF}$), the present AKMA temporary identifier (A-TID), the AKMA refresh parameter ($AKMA_R$), and the at least one SUPI associated with the UE 300. In one embodiment, the AKMA key identifier generator 350 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with the UE 300 to the KDF as shown in eq. (2).

At 456, the method includes sending, by the UE 300, an acknowledgment to the UDM 203. In one embodiment, the UE 300 sends the acknowledgment to the UDM 203 via the AMF 201.

At 458, the method includes sending, by the UE 300, an application session establishment request to the AF 205. In one embodiment, the UE 300 sends the application session establishment request to the AF 205 based on the new AKMA key identifier (A-KID').

FIG. 5 is an example sequential flow diagram illustrating generation of the new AKMA Key and associated AKMA Key Identifier, according to the embodiments as disclosed herein.

At 510, the UE 300 performs a primary authentication with network entity by reg-istering with the UDM 203. After performing the primary authentication the UE 300 and the AUSF 202 will derive the AUSF Key ($K_{AUSF}$) as specified in TS 33.501.

At 515, the UE 300 and the AF 205 will derive the $K_{AKMA}$ and $K_{AF}$ as per TS 33.535.

At 520, the AAnF 204 sends the AKMA refresh request to the UDM 203. In one embodiment, the AKMA refresh request received from the AAnF 204 includes an AKMA refresh indicator and at least one SUPI associated with the UE 300.

At 525, the UDM 203 generates the AKMA refresh parameter based on the received AKMA refresh request. In one embodiment, the AKMA refresh parameter generator 240 generates an AKMA refresh parameter ($AKMA_{RP}$). The $AKMA_{RP}$ can be generated by one of AUSF 202, UDM 203, and AAnF 204 based on an AKMA refresh indication request received. In one embodiment, the $AKMA_{RP}$ can be at least one of a random (RAND) value, a $Counter_{AKMA}$, and a $Counter_{AF}$ value.

At 530, the UDM 203 sends the AKMA refresh parameter to the AUSF 202. In one embodiment, the UDM 203 sends the AKMA refresh parameter ($AKMA_{RP}$) along with at least one SUPI associated with the UE 300 to the AUSF 202.

At 535, the AUSF 202 generates the new AKMA key ($K_{AKMA}'$) and associated AKMA key identifier (A-KID'). In an embodiment, the AKMA key generator 250 generates the new AKMA key ($K_{AKMA}'$). The AKMA key generator 250 generates the new AKMA key ($K_{AKMA}'$) based on the AKMA, the AUSF key ($K_{AUSF}$), the AKMA refresh parameter ($AKMA_{RP}$), and the at least one SUPI associated with the UE 300. In one embodiment, the new AKMA key ($K_{AKMA}'$) is generated by inputting the AUSF key ($K_{AUSF}$), the AKMA refresh parameter ($AKMA_{RP}$), "AKMA" and the at least one SUPI associated with the UE 300 to the KDF as shown in eq. (1). Further, in another embodiment, the AKMA key identifier generator 260 generates the new AKMA key identifier (A-KID'). The AKMA key identifier generator 260 generates the new AKMA key identifier (A-KID') by generating the new AKMA temporary identifier (A-TID'). The AKMA key identifier generator 260 generates the new AKMA temporary identifier (A-TID') based on the AUSF key ($K_{AUSF}$), "A-TID", the AKMA refresh parameter ($AKMA_{RP}$), and the at least one SUPI associated with the UE 300. In one embodiment, the AKMA key identifier generator 260 generates the new AKMA temporary identifier (A-TID') by inputting the AUSF key ($K_{AUSF}$), "A-TID", the AKMA refresh parameter ($AKMA_{RP}$), and the at least one SUPI associated with the UE 300 to the KDF as shown in eq. (2).

At 540, the AUSF 202 sends an AKMA response to the UDM 203. In one embodiment, the AUSF 202 send the AKMA refresh response to the UDM 203. The AKMA refresh response includes an acknowledgment for the AKMA refresh request received from the UDM 203. The AKMA refresh response also includes AKMA MAC-I$_{AUSF}$ and $Counter_{AKMA}$.

At 545, the AUSF 202 sends an AKMA Anchor Key Register Request Refresh Response to the AAnF 204. In one embodiment, the AUSF 202 send the AKMA Anchor Key Register Request Refresh Response to the AAnF 204. In one embodiment, the AKMA Anchor Key Register Request Refresh Response includes the new AKMA key ($K_{AKMA}'$), the at least one SUPI associated with the UE 300, and the new AKMA key identifier (A-KID').

At 550, the UDM 203 sends a notification to the AMF 201. In one embodiment, the UDM 203 sends the notification to the AMF 201. The notification includes at least one of AKMA refresh parameter ($AKMA_{RP}$), AKMA MAC-I$_{AUSF}$, and $Counter_{AKMA}$.

At 555, the AMF 201 sends a notification to the UE 300. In one embodiment, the AMF 201 sends the notification to the UE 300. The notification includes the at least one of AKMA refresh parameter ($AKMA_{RP}$), the AKMA MAC-I$_{AUSF}$, and the $Counter_{AKMA}$.

At 560, the UE 300 generates the new AKMA key and associated AKMA key identifier (A-KID) based on the received notification. In an embodiment, the AKMA key generator 340 generates the new AKMA key ($K_{AKMA}'$). The AKMA key generator 340 generates the new AKMA key ($K_{AKMA}'$) based on the AUSF key ($K_{AUSF}$), "AKMA", the AKMA refresh parameter ($AKMA_{RP}$), and the at least one SUPI associated with the UE 300. In one embodiment, the new AKMA key ($K_{AKMA}'$) is generated by inputting the AKMA, the AUSF key ($K_{AUSF}$), the AKMA refresh parameter ($AKMA_{R}$), and the at least one SUPI associated with the UE 300 to the KDF as shown in eq. (1). Further, in another embodiment, the AKMA key identifier generator 370 generates the new AKMA key identifier (A-KID'). The AKMA key identifier generator 350 generates the new AKMA key identifier (A-KID') by generating the new AKMA temporary identifier (A-TID'). The AKMA key identifier generator 350 generates the new AKMA temporary identifier (A-TID') based on the AUSF key ($K_{AUSF}$), "A-TID", the AKMA refresh parameter ($AKMA_{RP}$), and the at least one SUPI associated with UE 300. In one embodiment, the AKMA key identifier generator 350 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with UE 300 to the key distribution function as shown in eq. (2).

At 565, the UE 300 sends an acknowledgment to the AMF 201. In one embodiment, the UE 300 sends the acknowledgment to the AMF 201.

At 570, the AMF 201 sends an acknowledgment to the UDM 203. In one embodiment, the AMF 201 sends the acknowledgment to the UDM 203.

At 575, the UE 300 sends an application session establishment request to the AF 205. In one embodiment, the UE 300 sends the application session establishment request to the AF 205 based on the new AKMA key identifier (A-KID').

FIG. 6 is another example sequential flow diagram illustrating generation of the new AKMA Key and associated AKMA Key Identifier, according to the embodiments as disclosed herein.

At 610, the UE 300 performs a primary authentication with network entity by reg-istering with the UDM 203. After performing the primary authentication the UE 300 and AUSF 202 will derive the AUSF Key ($K_{AUSF}$) as specified in TS 33.501.

At 615, the UE 300 and the AF 205 will derive the $K_{AKMA}$ and the $K_{AF}$ as per TS 33.535.

At 620, the AAnF 204 sends an AKMA refresh request to the UDM 203. In one embodiment, the AKMA refresh request received from the AAnF 204 includes an AKMA refresh indicator and at least one SUPI associated with the at least one user equipment (UE).

At 625, the UDM 203 generates an AKMA refresh parameter based on the received AKMA refresh request. In one embodiment, the AKMA refresh parameter generator 240 generates the AKMA refresh parameter ($AKMA_{RP}$). The $AKMA_{RP}$ can be generated by one of the AUSF 202, the UDM 203, and the AAnF 204 based on an AKMA refresh indication request received. In one embodiment, the $AKMA_{RP}$ can be at least one of the random (RAND) value, the $Counter_{AKMA}$, and the $Counter_{AF}$ value.

At 630, the UDM 203 sends the AKMA refresh parameter to the AUSF 202. In one embodiment, the UDM 203 sends the AKMA refresh parameter ($AKMA_{RP}$) along with at least one SUPI associated with UE 300 to the AUSF 202.

At 635, the AUSF 202 generates the new AKMA key ($K_{AKMA}'$) and associated AKMA key identifier (A-KID'). In an embodiment, the AKMA key generator 250 generates the new AKMA key ($K_{AKMA}'$). The AKMA key generator 250 generates the new AKMA key ($K_{AKMA}'$) based on the AUSF key ($K_{AUSF}$), "AKMA", the AKMA refresh parameter (AK- $MA_{RP}$), and the at least one SUPI associated with the UE 300. In one embodiment, the new AKMA key ($K_{AKMA}'$) is generated by inputting the AKMA, the AUSF key ($K_{AUSF}$), the AKMA refresh parameter ($AKMA_{RP}$), and the at least one SUPI associated with the UE 300 to the KDF as shown in eq. (1). Further, in another embodiment, the AKMA key identifier generator 260 generates the new AKMA key identifier (A-KID'). The AKMA key identifier generator 260 generates the new AKMA key identifier (A-KID') by generating the new AKMA temporary identifier (A-TID'). The AKMA key identifier generator 260 generates the new AKMA temporary identifier (A-TID') based on the AUSF key ($K_{AUSF}$), "A-TID", the AKMA refresh parameter ($AKMA_{RP}$), and the at least one SUPI associated with UE 300. In one embodiment, the AKMA key identifier generator 260 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with UE 300 to the KDF as shown in eq. (2).

At 640, the AUSF 202 sends an AKMA response to the UDM 203. In one embodiment, the AUSF 202 sends the AKMA refresh response to the UDM 203. The AKMA refresh response includes an acknowledgment for the AKMA refresh request received from the UDM 203. The AKMA refresh response also includes the AKMA MAC-$I_{AUSF}$ and the Counter$_{AKMA}$.

At 645, the UDM 203 sends a notification to the AMF 201. In one embodiment, the UDM 203 sends the notification to the AMF 201. The notification includes at least one of the AKMA refresh parameter ($AKMA_{RP}$), the AKMA MAC-$I_{AUSF}$, and the Counter$_{AKMA}$.

At 650, the AMF 201 sends a notification to the UE 300. In one embodiment, the AMF 201 sends the notification to the UE 300. The notification includes at least one of the AKMA refresh parameter ($AKMA_{RP}$), the AKMA MAC-$I_{AUSF}$, and the Counter$_{AKMA}$.

At 655, the UE 300 generates the new AKMA key and associated AKMA key identifier (A-KID) based on the received notification. In an embodiment, the AKMA key generator 340 generates the new AKMA key ($K_{AKMA}'$). The AKMA key generator 340 generates the new AKMA key ($K_{AMKA}'$) based on the AUSF key ($K_{AUSF}$), "AKMA" the AKMA refresh parameter ($AKMA_{RP}$), and the at least one SUPI associated with UE 300. In one embodiment, the new AKMA key ($K_{AKMA}'$) is generated by inputting the AKMA, the AUSF key ($K_{AUSF}$), the AKMA refresh parameter ($AKMA_{RP}$), and the at least one SUPI associated with the UE 300 to the KDF as shown in eq. (1). Further, in another embodiment, the AKMA key identifier generator 350 generates the new AKMA key identifier (A-KID'). The AKMA key identifier generator 350 generates the new AKMA key identifier (A-KID') by generating the new AKMA temporary identifier (A-TID'). The AKMA key identifier generator 350 generates the new AKMA temporary identifier (A-TID') based on the AUSF key ($K_{AUSF}$), "A-TID", the AKMA refresh parameter ($AKMA_{RP}$), and the at least one SUPI associated with UE 300. In one embodiment, the AKMA key identifier generator 350 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with UE 300 to the KDF as shown in eq. (2).

At 660, the UE 300 sends an acknowledgment to the AMF 201. In one embodiment, the UE 300 sends the acknowledgment to the AMF 201.

At 665, the UDM 203 sends a refresh information to the AUSF 202. In one embodiment, the UDM 203 sends the refresh information to the AUSF 202 that includes an acknowledgment about reception of acknowledgment from the AMF 201.

At 670, the AMF 201 sends an acknowledgment to the UDM 203. In one embodiment, the AMF 201 sends the acknowledgment to the UDM 203.

At 675, the AUSF 202 sends an AKMA Anchor Key Register Request Refresh Response to the AAnF 204. In one embodiment, the AUSF 202 sends the AKMA Anchor Key Register Request Refresh Response to the AAnF 204. In one embodiment, the AKMA Anchor Key Register Request Refresh Response includes the new AKMA key ($K_{AKMA}'$), the at least one SUPI associated with UE 300, and the new AKMA key identifier (A-KID').

At 680, the UE 300 sends an application session establishment request to the AF 205. In one embodiment, the UE 300 sends the application session establishment request to the AF 205 based on the new AKMA key identifier (A-KID').

FIG. 7 is an example sequential flow diagram illustrating generation of a new AKMA Key and associated AKMA Key Identifier, according to the embodiments as disclosed herein.

At 710, the UE 300 performs a primary authentication with network entity by reg-istering with the UDM 203. After performing the primary authentication, the UE 300 and the AUSF 202 will derive the AUSF Key ($K_{AUSF}$) as specified in TS 33.501.

At 715, the UE 300 and the AF 205 will derive the $K_{AKMA}$ and $K_{AF}$ as per TS 33.535.

At 720, the AAnF 204 sends an AKMA refresh request to the UDM 203. In one embodiment, the AKMA refresh request received from the AAnF 204 includes the AKMA refresh indicator and the at least one SUPI associated with the at least one user equipment (UE).

At 725, the UDM 203 sends the AKMA refresh request to the AUSF 202. In one embodiment, the UDM 203 sends the AKMA refresh request along with the at least one SUPI associated with the UE 300 to the AUSF 202.

At 730, the AUSF 202 generates the AKMA refresh parameter ($AKMA_{RP}$), the new AKMA key ($K_{AKMA}'$) and associated AKMA key identifier (A-KID'). In one embodiment, the AKMA refresh parameter generator 240 generates the AKMA refresh parameter ($AKMA_{RP}$). In one embodiment, the $AKMA_{RP}$ can be at least one of the random (RAND) value, the Counter$_{AKMA}$, and the Counter$_{AF}$ value. In an embodiment, the AKMA key generator 250 generates the new AKMA key ($K_{AKMA}'$). The AKMA key generator 250 generates the new AKMA key ($K_{AKMA}'$), the AUSF key ($K_{AUSF}$), "AKMA", the AKMA refresh parameter ($AKMA_{RP}$), and the at least one SUPI associated with UE 300. In one embodiment, the new AKMA key ($K_{AKMA}'$) is generated by inputting the AKMA, the AUSF key ($K_{AUSF}$), the AKMA refresh parameter (AKMA RP), and the at least one SUPI associated with UE 300 to the KDF as shown in eq. (1). Further, in another embodiment, the AKMA key identifier generator 260 generates the new AKMA key identifier (A-KID'). The AKMA key identifier generator 260 generates the new AKMA key identifier (A-KID') by generating the new AKMA temporary identifier (A-TID'). The AKMA key identifier generator 260 generates the new AKMA temporary identifier (A-TID') based on the AUSF key ($K_{AUSF}$), "A-TID", the AKMA refresh parameter ($AKMA_{RP}$), and the at least one SUPI associated with UE 300. In one embodiment, the AKMA key identifier generator 260 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with UE 300 to the KDF as shown in eq. (2).

At 735, the AUSF 202 sends an AKMA response to the UDM 203. In one embodiment, the AUSF 202 send the AKMA refresh response to the UDM 203. The AKMA refresh response includes an acknowledgment for the AKMA refresh request received from the UDM 203. The AKMA refresh response also includes the AKMA MAC-$I_{AUSF}$ and the $Counter_{AKMA}$.

At 740, the AUSF 202 sends an AKMA Anchor Key Register Request Refresh Response to the AAnF 204. In one embodiment, the AUSF 202 sends the AKMA Anchor Key Register Request Refresh Response to the AAnF 204. In one embodiment, the AKMA Anchor Key Register Request Refresh Response includes the new AKMA key ($K_{AKMA}'$), at least one SUPI associated with UE 300, and the new AKMA key identifier (A-KID').

At 745, the UDM 203 sends a notification to the AMF 201. In one embodiment, the UDM 203 sends the notification to the AMF 201. The notification includes at least one of AKMA refresh parameter ($AKMA_{RP}$), AKMA MAC-$I_{AUSF}$, and $Counter_{AKMA}$.

At 750, the AMF 201 sends a notification to the UE 300. In one embodiment, the AMF 201 sends the notification to the UE 300. The notification includes at least one of AKMA refresh parameter ($AKMA_{RP}$), AKMA MAC-$I_{AUSF}$, and $Counter_{AKMA}$.

At 755, the UE 300 generates a new AKMA key and associated AKMA key identifier (A-KID) based on the received notification. In an embodiment, the AKMA key generator 340 generates the new AKMA key ($K_{AKMA}'$). The AKMA key generator 340 generates the new AKMA key ($K_{AKMA}'$) based on the AUSF key ($K_{AUSF}$), "AKMA", the AKMA refresh parameter ($AKMA_{RP}$), and the at least one SUPI associated with UE 300. In one embodiment, the new AKMA key ($K_{AKMA}'$) is generated by inputting the AKMA, the AUSF key ($K_{AUSF}$), the AKMA refresh parameter (AKMA RP), and at least one SUPI associated with UE 300 to the KDF as shown in eq. (1). Further, in another embodiment, the AKMA key identifier generator 350 generates the new AKMA key identifier (A-KID'). The AKMA key identifier generator 350 generates the new AKMA key identifier (A-KID') by generating the new AKMA temporary identifier (A-TID'). The AKMA key identifier generator 350 generates the new AKMA temporary identifier (A-TID') based on the AUSF key ($K_{AUSF}$), "A-TID", the AKMA refresh parameter ($AKMA_{RP}$), and the at least one SUPI associated with UE 300. In one embodiment, the AKMA key identifier generator 350 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with UE 300 to the KDF as shown in eq. (2).

At 760, the UE 300 sends an acknowledgment to the AMF 201. In one embodiment, the UE 300 sends the acknowledgment to the AMF 201.

At 765, the AMF 201 sends an acknowledgment to the UDM 203. In one embodiment, the AMF 201 sends the acknowledgment to the UDM 203.

At 770, the UE 300 sends an application session establishment request to the AF 205. In one embodiment, the UE 300 sends the application session establishment request to the AF 205 based on the new AKMA key identifier (A-KID').

FIG. 8 is yet another example sequential flow diagram illustrating generation of a new AKMA Key and associated AKMA Key Identifier, according to the embodiments as disclosed herein.

At 810, the UE 300 performs a primary authentication with network entity by reg-istering with the UDM 203. After performing the primary authentication, the UE 300 and the AUSF 202 will derive the AUSF Key ($K_{AUSF}$) as specified in TS 33.501.

At 815, the UE 300 and the AF 205 will derive the $K_{AKMA}$ and the $K_{AF}$ as per TS 33.535.

At 820, the AAnF 204 generates an AKMA refresh parameter. In one embodiment, the AKMA refresh parameter generator 240 generates an AKMA refresh parameter ($AKMA_R$). In one embodiment, the $AKMA_{RP}$ can be at least one of the random (RAND) value, the $Counter_{AKMA}$, and the $Counter_{AF}$ value.

At 825, the AAnF 204 sends an AKMA refresh request to the UDM 203. In one embodiment, the AKMA refresh request received from the AAnF 204 includes the AKMA refresh parameter and the at least one SUPI associated with the at least one user equipment (UEL).

At 830, the UDM 203 sends the AKMA refresh parameter to the AUSF 202. In one embodiment, the UDM 203 sends the AKMA refresh parameter ($AKMA_{RP}$) along with the at least one SUPI associated with UE 300 to the AUSF 202.

At 835, the AUSF 202 generates the new AKMA key ($K_{AKMA}'$) and associated AKMA key identifier (A-KID'). In an embodiment, the AKMA key generator 250 generates the new AKMA key ($K_{AKMA}'$). The AKMA key generator 250 generates the new AKMA key ($K_{AKMA}'$) based on the AKMA, the AUSF key ($K_{AUSF}$), the AKMA refresh parameter ($AKMA_{RP}$), and the at least one SUPI associated with the UE 300. In one embodiment, the new AKMA key ($K_{AKMA}'$) is generated by inputting the "AKMA", the AUSF key ($K_{AUSF}$), the AKMA refresh parameter ($AKMA_{RP}$), and the at least one SUPI associated with UE 300 to the KDF as shown in eq. (1). Further, in another embodiment, the AKMA key identifier generator 260 generates the new AKMA key identifier (A-KID'). The AKMA key identifier generator 260 generates the new AKMA key identifier (A-KID') by generating the new AKMA temporary identifier (A-TID'). The AKMA key identifier generator 260 generates the new AKMA temporary identifier (A-TID') based on the AUSF key ($K_{AUSF}$), "A-TID", the AKMA refresh parameter ($AKMA_{RP}$), and the at least one SUPI associated with UE 300. In one embodiment, the AKMA key identifier generator 260 generates the new AKMA temporary identifier (A-TID') by inputting the AUSF key ($K_{AUSF}$), the present AKMA temporary identifier (A-TID), the AKMA refresh parameter ($AKMA_{RP}$), and the at least one SUPI associated with UE 300 to the key distribution function as shown in eq. (2).

At 840, the AUSF 202 sends an AKMA response to the UDM 203. In one embodiment, the AUSF 202 send the AKMA refresh response to the UDM 203. The AKMA refresh response includes an acknowledgment for the AKMA refresh request received from the UDM 203. The AKMA refresh response also includes the AKMA MAC-$I_{AUSF}$ and the $Counter_{AKMA}$.

At 845, the AUSF 202 sends an AKMA Anchor Key Register Request Refresh Response to the AAnF 204. In one embodiment, the AUSF 202 sends the AKMA Anchor Key Register Request Refresh Response to the AAnF 204. In one embodiment, the AKMA Anchor Key Register Request Refresh Response includes the new AKMA key ($K_{AKMA}'$), at least one SUPI associated with UE 300, and the new AKMA key identifier (A-KID').

At 850, the UDM 203 sends a notification to the AMF 201. In one embodiment, the UDM 2003 sends the notification to the AMF 201. The notification includes at least one of the AKMA refresh parameter (AKMA$_{RP}$), the AKMA MAC-I$_{AUSF}$, and the Counter$_{AKMA}$.

At 855, the AMF 201 sends a notification to the UE 300. In one embodiment, the AMF 201 sends the notification to the UE 300. The notification includes at least one of the AKMA refresh parameter (AKMA$_{RP}$), the AKMA MAC-I$_{AUSF}$, and the Counter$_{AKMA}$.

At 860, the UE 300 generates a new AKMA key and associated AKMA key identifier (A-KID) based on the received notification. In an embodiment, the AKMA key generator 340 generates a new AKMA key (K$_{AKMA}$'). The AKMA key generator 340 generates the new AKMA key (K$_{AKMA}$') based on the AUSF key (K$_{AUSF}$), "AKMA", the AKMA refresh parameter (AKMA$_{RP}$), and the at least one SUPI associated with the UE 300. In one embodiment, the new AKMA key (K$_{AKMA}$') is generated by inputting the AKMA, the AUSF key (K$_{AUSF}$), the AKMA refresh parameter (AKMA$_{RP}$), and the at least one SUPI associated with the UE 300 to the KDF as shown in eq. (1). Further, in another embodiment, the AKMA key identifier generator 350 generates the new AKMA key identifier (A-KID'). The AKMA key identifier generator 350 generates the new AKMA key identifier (A-KID') by generating the new AKMA temporary identifier (A-TID'). The AKMA key identifier generator 350 generates the new AKMA temporary identifier (A-TID') based on the AUSF key (K$_{AUSF}$), "A-TID", the AKMA refresh parameter (AKMA$_{RP}$), and the at least one SUPI associated with the UE 300. In one embodiment, the AKMA key identifier generator 350 generates the new AKMA temporary identifier (A-TID') by inputting the AUSF key (K$_{AUSF}$), the present AKMA temporary identifier (A-TID), the AKMA refresh parameter (AKMA$_{R}$), and the at least one SUPI associated with the UE 300 to the KDF as shown in eq. (2).

At 865, the UE 300 sends an acknowledgment to the AMF 201. In one embodiment, the UE 300 sends the acknowledgment to the AMF 201.

At 870, the AMF 201 sends an acknowledgment to the UDM 203. In one embodiment, the AMF 201 sends the acknowledgment to the UDM 203.

At 875, the UE 300 sends an application session establishment request to the AF 205. In one embodiment, the UE 300 sends the application session establishment request to the AF 205 based on the new AKMA key identifier (A-KID').

FIG. 9 is an example sequential flow diagram illustrating generation of a new AF Key, according to the embodiments as disclosed herein.

At 910, the UE 300 performs a primary authentication with network entity by reg-istering with the UDM 203. After performing the primary authentication, the UE 300 and the AUSF 202 will derive the AUSF Key (K$_{AUSF}$) as specified in TS 33.501.

At 915, the UE 300 and the AF 205 will derive the K$_{AKMA}$ and the K$_{AF}$ as per TS 33.535.

At 920, the AAnF 204 sends an AKMA refresh request to the UDM 203. In one embodiment, the AKMA refresh request received from the AAnF 204 includes the AKMA refresh indicator and the at least one SUPI associated with the at least one user equipment (UE).

At 925, the UDM 203 triggers a new K$_{AF}$ refresh based on the AKMA refresh request received from the AAnF.

At 930, the UDM 203 sends an AKMA refresh request to the AUSF 202. In one embodiment, the AKMA refresh request received from the AUSF 202 includes an AKMA refresh indicator and the at least one SUPI associated with the at least one user equipment (UE).

At 935, the UDM 203 generates an AKMA refresh parameter based on the received AKMA refresh request. In one embodiment, the AKMA refresh parameter generator 240 generates an AKMA refresh parameter (AKMA$_{RP}$). In one embodiment, the AKMA, can be at least one of the random (RAND) value, the Counter$_{AKMA}$, and the Counter$_A$ value.

At 940, the AUSF 202 sends an AKMA response to the UDM 203. In one embodiment, the AUSF 202 sends the AKMA refresh response to the UDM 203. The AKMA refresh response includes an acknowledgment for the AKMA refresh request received from the UDM 203. The AKMA refresh response also includes AKMA MAC-I$_{AUSF}$, and Counter$_{AKMA}$.

At 945, the UDM 203 sends an AKMA refresh response to the AAnF 204. In one embodiment, the AKMA refresh response includes the AKMA refresh parameter (AKMA$_{RP}$).

At 950, the AAnF 204 generates a new AF key (K$_A$) based on the AKMA refresh response.

At 955, the UDM 203 sends a notification to the AMF 201. In one embodiment, the UDM 203 sends the notification to the AMF 201. The notification includes at least one of AKMA refresh parameter (AKMA$_{RP}$), AKMA MAC-I$_{AUSF}$, and Counter$_{AKMA}$.

At 960, the AMF 201 sends a notification to the UE 300. In one embodiment, the AMF 201 sends the notification to the UE 300. The notification includes at least one of AKMA refresh parameter (AKMA$_{RP}$), AKMA MAC-I$_{AUSF}$, and Counter$_{AKMA}$.

At 965, the UE 300 generates a new AF key based on the received notification.

At 970, the UE 300 sends an acknowledgment to the AMF 201. In one embodiment, the UE 300 sends the acknowledgment to the AMF 201.

At 975, the AMF 201 sends an acknowledgment to the UDM 203. In one embodiment, the AMF 201 sends the acknowledgment to the UDM 203.

FIG. 10 is an example sequential flow diagram illustrating generation of a new AKMA Key based on a timer, according to the embodiments as disclosed herein.

At 1010, the UE 300 performs a primary authentication with network entity by reg-istering with the AAnF 204. After performing the primary authentication, the UE 300 and the AUSF 202 will derive the AUSF Key (K$_{AUSF}$).

At 1015, the UE 300 sends an application session establishment request to the AF 205. In one embodiment, the UE 300 sends the application session establishment request to the AF based on the AKMA key identifier (A-KID).

At 1020, the AF 205 determines that the K$_{AF}$ as invalid when the timer associated with K$_{AF}$ is expired.

At 1025, the AF 205 send a new AF key (K$_{AF}$') request to the AAnF 204.

At 1030, the AAnF 204 send a request reject to the AF 205 if the new AF key (K$_A$) is not available with the AAnF 204 along with current timer value of K$_{AF}$.

At 1035, the AF 205 sends a reject message along the current timer value to the UE 300.

At 1040, the AAnF 204 triggers new AKMA key (K$_{AKMA}$).

At 1045, the AAnF 204 send a refresh parameter request to the UDM 203.

At 1050, the UDM 203 generates the AKMA refresh parameter ($AKMA_{RP}$) and send the AKMA refresh response as an acknowledgment along with the generated $AKMA_{RP}$ to the AUSF 202.

At 1055, the AUSF 202 sends an AKMA refresh response upon receiving the AKMA refresh parameter from the UDM 203.

At 1060, the UDM 203 sends the generated $AKMA_{RP}$ along with associated new timer to the UE 300.

At 1065, the UE 300 generates new AKMA key ($K_{AKMA}$).

At 1070, the AUSF 202 generates new AKMA key ($K_{AKMA}$).

At 1075, the AUSF 202 sends an AKMA Anchor Key register request to the AAnF 204. In one embodiment, the AKMA Anchor Key register request includes the generated $K_{AKMA}{}'$.

At 1080, the AAnF 204 sends an AKMA Anchor Key register request to the AUSF 202. In one embodiment, the AKMA Anchor Key register response includes an acknowledgment for the $K_{AKMA}{}'$ received at the AAnF 204.

FIG. 11 is an example sequential flow diagram illustrating generation of a new AF Key based on a timer, according to the embodiments as disclosed herein.

At 1110, the UE 300 performs a primary authentication with network entity by reg-istering with the AAnF 203. After performing the primary authentication, the UE 300 and the AUSF 202 will derive the AUSF Key ($K_{AUSF}$).

At 1115, the UE 300 sends an application session establishment request to the AF 205. In one embodiment, the UE 300 sends the application session establishment request to the AF 205 based on the AKMA key identifier (A-KID).

At 1120, the AF 205 determines that the $K_{AF}$ as invalid when the timer associated with $K_{AF}$ is expired.

At 1125, the AF 205 sends a new AF key ($K_{AF}{}'$) request to the AAnF 204.

At 1130, the AAnF 204 sends a request reject to the AF 205 if the new AF key ($K_{AF}$) is not available with the AAnF 204 along with current timer value of $K_{AF}$.

At 1135, the AF 205 sends a reject message along the current timer value to the UE 300.

At 1140, the AAnF 204 triggers a new AF key ($K_{AF}{}'$).

At 1145, the AAnF 204 sends a refresh parameter request to the UDM 203.

At 1150, the UDM 203 generates the AKMA refresh parameter ($AKMA_{RP}$) and send the AKMA refresh response as an acknowledgment along with the generated $AKMA_{RP}$ to the AAnF 204.

At 1155, the UDM 203 sends the generated $AKMA_{RP}$ along with associated new timer to the UE 300.

At 1160, the UE 300 generates the new AF key ($K_{AF}{}'$).

At 1165, the AAnF 204 generate the new AF key ($K_{AF}{}'$).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a Unified Data Management (UDM) in a wireless network for generating at least one new Authentication and Key Management for Application (AKMA) key, the method comprising:

receiving a first request from an AKMA Anchor Function (AAnF), wherein the first request is for AKMA refresh and the first request includes at least one subscription permanent identifier (SUPI) associated with at least one user equipment (UE) for generating at least one new AKMA key;

generating at least one AKMA parameter for refresh based on the received first request; and sending the at least one generated AKMA parameter for refresh to an Authentication Server Function (AUSF) for generating the at least one new AKMA key.

2. The method of claim 1, wherein the method further comprising:

receiving at least one response message from the AUSF upon generating the at least one new AKMA key by the AUSF.

3. The method of claim 1, wherein the method further comprising:

sending the at least one generated AKMA parameter for refresh to at least one UE through an Access and Mobility Management Function (AMF).

4. The method of claim 1, wherein the at least one new AKMA key is associated with a new AKMA Key Identifier.

5. A method of generating at least one new Authentication and Key Management for Application (AKMA) key by a User Equipment (UE) in a wireless network, the method comprising:

receiving a first request from a Unified Data Management (UDM), wherein the first request comprises a Authentication and Key Management for Application (AKMA) parameter for refresh for generating the at least one new AKMA key;

generating the at least one new AKMA key and associated new AKMA key identifier (A-KID') based on the at least one received AKMA parameter for refresh; and sending a second request to at least one Application Function (AF), based on the at least one generated new AKMA key, wherein the second request is an application session establishment request for establishing communication between the UE and the at least one AF.

6. The method of claim 5, wherein the method further comprising;

sending at least one acknowledgment to the UDM in response to the generating the at least one new AKMA key.

7. The method of claim 5, wherein the generated at least one new AKMA key is associated with the A-KID'.

8. A Unified Data Management (UDM) in a wireless network for generating at least one new Authentication and key Management for Application (AKMA) key, the UDM comprising:

a communicator; and a processor, coupled to the communicator, configured to:

receive a first request from an AKMA Anchor Function (AAnF), wherein the first request is for AKMA refresh and the first request includes at least one subscription permanent identifier (SUPI) associated with at least one user equipment (UE) for generating at least one new AKMA key, generate at least one AKMA parameter for refresh based on the received first request, and send the at least one generated AKMA parameter for refresh to an Authentication Server Function (AUSF) for generating the at least one new AKMA key.

9. The UDM of claim 8, wherein the processor is further configured to:

send the at least one generated AKMA parameter for refresh to at least one UE through an Access and Mobility Management Function (AMF).

10. A User Equipment (UE) in a wireless network for generating at least one new Authentication and Key Management for Application (AKMA) key, the UE comprising:

a communicator; and a processor, coupled to the communicator, configured to:

receive a first request from a Unified Data Management (UDM), wherein the first request comprises a Authentication and Key Management for Application (AKMA) parameter for refresh for generating the at least one new AKMA key, generate the at least one new AKMA key and associated new AKMA key identifier (A-KID') based on the at least one received AKMA parameter for refresh, and send a second request to at least one Application Function (AF), based on the at least one generated new AKMA key, wherein the second request is an application session establishment request for establishing communication between the UE and the at least one AF.

11. The UE of claim 10, wherein the processor is further configured to:

send at least one acknowledgment to the UDM in response to the generating the at least one new AKMA key.

12. The UE of claim 10, wherein the generated at least one new AKMA key is associated with the A-KID'.

* * * * *